US 11,854,583 B2

(12) United States Patent
McAlpine et al.

(10) Patent No.: US 11,854,583 B2
(45) Date of Patent: Dec. 26, 2023

(54) HEAD GIMBAL ASSEMBLY WITH DAMPING MATERIAL

(71) Applicant: Regents of the University of Minnesota, Minneapolis, MN (US)

(72) Inventors: Michael C. McAlpine, Minneapolis, MN (US); Ghazaleh Haghiashtiani, Minneapolis, MN (US); Zhijie Zhu, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 17/301,199

(22) Filed: Mar. 29, 2021

(65) Prior Publication Data

US 2021/0312946 A1 Oct. 7, 2021

Related U.S. Application Data

(60) Provisional application No. 63/004,854, filed on Apr. 3, 2020.

(51) Int. Cl.
*G11B 5/48* (2006.01)
*G11B 33/08* (2006.01)

(52) U.S. Cl.
CPC ............ *G11B 5/4833* (2013.01); *G11B 33/08* (2013.01)

(58) Field of Classification Search
None
See application file for complete search history.

(56) References Cited

U.S. PATENT DOCUMENTS

| | | | | |
|---|---|---|---|---|
| 6,212,043 B1* | 4/2001 | Nakamura et al. | .. | G11B 5/4833 360/244.3 |
| 6,271,996 B1* | 8/2001 | Houk et al. | ............ | G11B 33/08 360/244.9 |
| 6,704,164 B1* | 3/2004 | Hiraoka | ............... | G11B 5/4833 360/246 |
| 6,967,821 B2* | 11/2005 | Himes et al. | ........ | G11B 5/4826 360/245.3 |
| 10,650,851 B1* | 5/2020 | Atitallah et al. | ...... | G11B 5/4833 |
| 2004/0264054 A1* | 12/2004 | Hutchinson | .......... | G11B 5/4833 360/244.8 |
| 2005/0157427 A1* | 7/2005 | Renken et al. | ...... | G11B 5/4833 360/244.9 |
| 2008/0158725 A1* | 7/2008 | Hirano et al. | ........ | G11B 5/4833 360/240 |
| 2010/0238594 A1* | 9/2010 | Nakamura et al. | .. | G11B 5/4833 360/246.1 |
| 2015/0055254 A1* | 2/2015 | Bjorstrom et al. | .... | G11B 5/483 360/294.3 |

* cited by examiner

*Primary Examiner* — Craig A. Renner
(74) *Attorney, Agent, or Firm* — Shumaker & Sieffert, P.A.

(57) ABSTRACT

The disclosure describes a head gimbal assembly including a suspension and a damping layer on a surface of the suspension. The suspension may include a slider mount configured to establish mechanical communication with a slider and the layer may be displaced from the slider mount. The layer may be configured to provide passive damping or active damping.

17 Claims, 27 Drawing Sheets

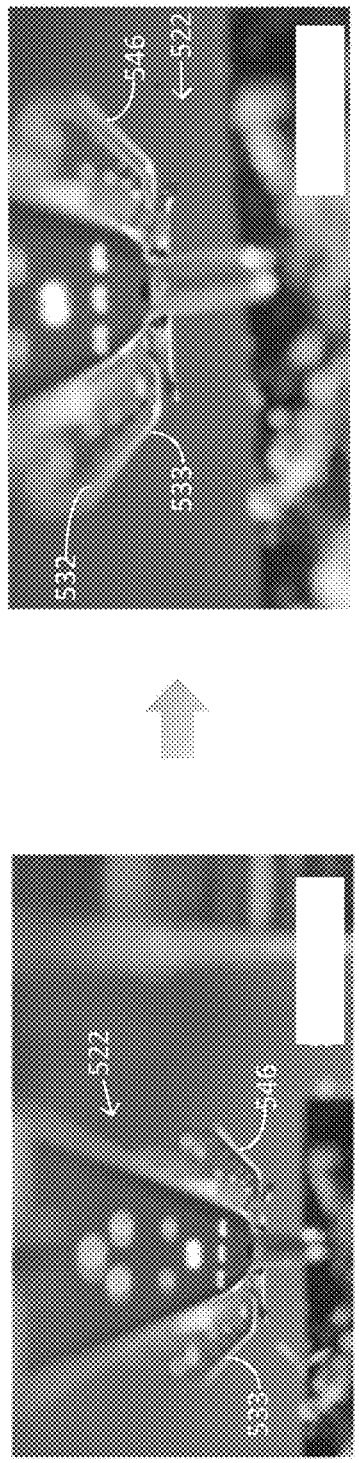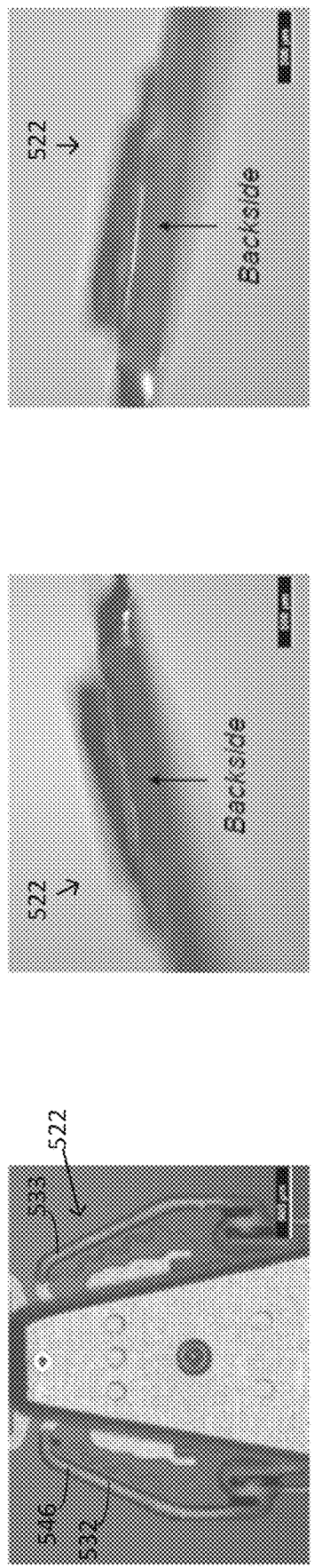
FIG. 5

Printing two layers of Ecoflex on HGA backside
*Samples thickness measurement*

| | Left Arm (nm) | Right Arm (nm) | | Left Arm (nm) | Right Arm (nm) |
|---|---|---|---|---|---|
| Sample 1 | 64,066 ± 7,664 | 68,720 ± 7,681 | Sample 11 | 72,163 ± 12,044 | 71,523 ± 9,956 |
| Sample 2 | 63,752 ± 11,612 | 57,956 ± 3,602 | Sample 12 | 69,102 ± 15,732 | 68,307 ± 8,679 |
| Sample 3 | 63,169 ± 14,463 | 64,787 ± 14,226 | Sample 13 | 68,644 ± 10,480 | 73,017 ± 8,082 |
| Sample 4 | 62,536 ± 8,313 | 68,324 ± 5,427 | Sample 14 | 64,140 ± 21,970 | 70,730 ± 15,439 |
| Sample 5 | 57,568 ± 11,393 | 67,769 ± 18,285 | Sample 15 | 86,127 ± 21,765 | 104,476 ± 13,742 |
| Sample 6 | 69,293 ± 21,400 | 74,449 ± 23,908 | Sample 16 | 66,096 ± 7,264 | 55,283 ± 9,875 |
| Sample 7 | 69,375 ± 14,433 | 66,535 ± 9,809 | Sample 17 | 65,190 ± 12,743 | 63,083 ± 6,653 |
| Sample 8 | 64,951 ± 18,605 | 70,441 ± 17,657 | Sample 18 | 61,636 ± 9,355 | 63,985 ± 9,294 |
| Sample 9 | 64,571 ± 11,496 | 69,226 ± 7,693 | Sample 19 | 59,541 ± 28,796 | 58,016 ± 8,255 |
| Sample 10 | 71,560 ± 32,471 | 67,322 ± 22,017 | Sample 20 | 68,287 ± 14,690 | 70,781 ± 9,082 |

Average of all samples: 67.663 ± 8.107 μm

FIG. 6

Statistical Analysis Parameter Definition

- Input parameters:
  - $X_1$ : Thickness
    - Corresponds to the thickness of the deposited material on the struts
    - Defined as the average of thickness between two arms
  - $X_2$ : Uniformity
    - Corresponds to how uniform the material is deposited on the struts
    - Defined as the std dev of the measurements on the two arms (total of 8 points)
  - $X_3$ : Asymmetry
    - Corresponds to the symmetry of the deposited material on the two arms
    - Defined as the difference between the mean thickness of the two arms

- Output parameter:
  - $Y_f$ : Gain reduction
    - Corresponds to the amount of reduction in gain at a specified frequency $f$

- Function:

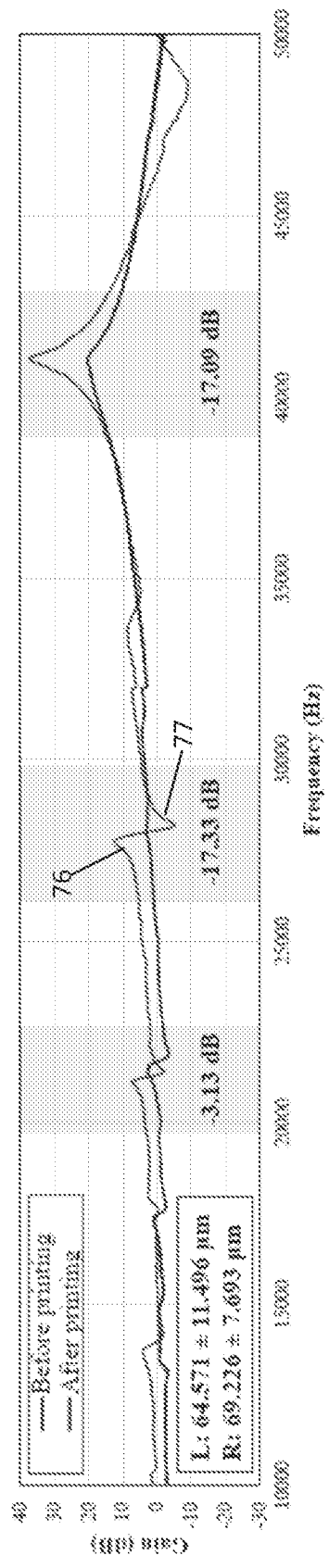
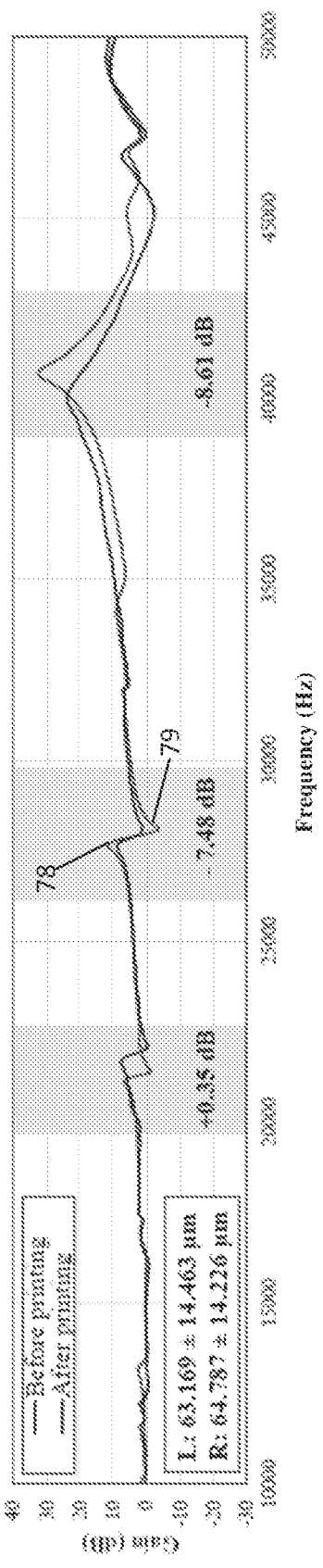
FIG. 12

Analysis: samples with two layers of Ecoflex as the damping material
- Microscopic images of sample 9 (higher gain reduction)
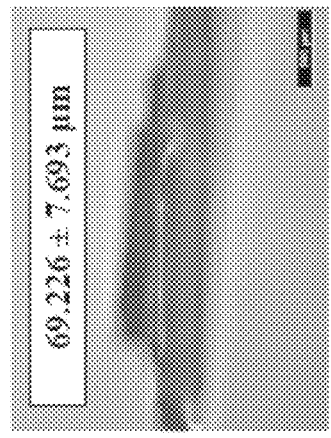 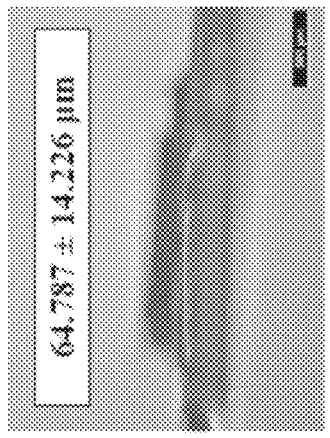
- Microscopic images of sample 3 (lower gain reduction)
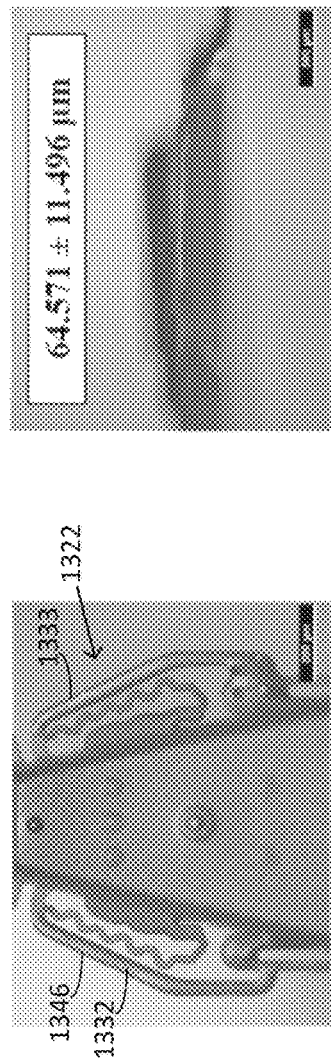 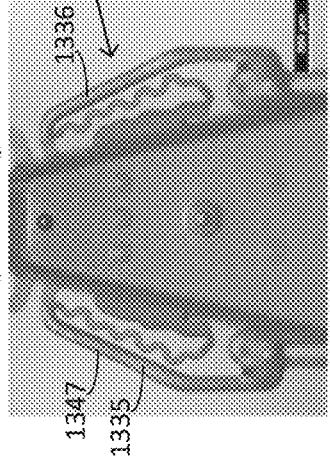
FIG. 13

Previous Printing on the HGA Backside with RTV: Results
- Material: RTV silicone
- Nozzle inner diameter: 95 μm
- Printing speed: 0.25 mm/s
- Printing pressure: 150 × 7 kPa
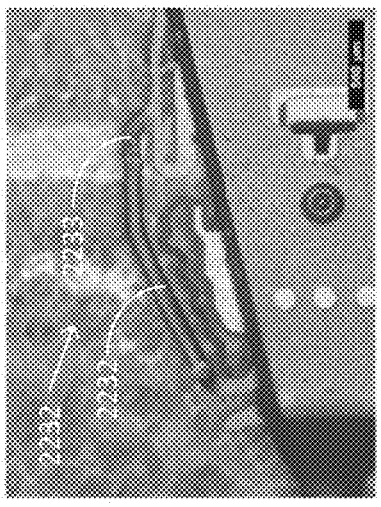
Before Printing
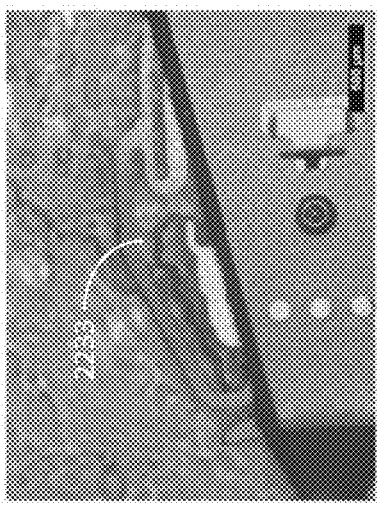
After Printing
Left Arm
Average Measured Thickness: 90.54 μm
Right Arm
Average Measured Thickness: 52.72 μm
FIG. 22

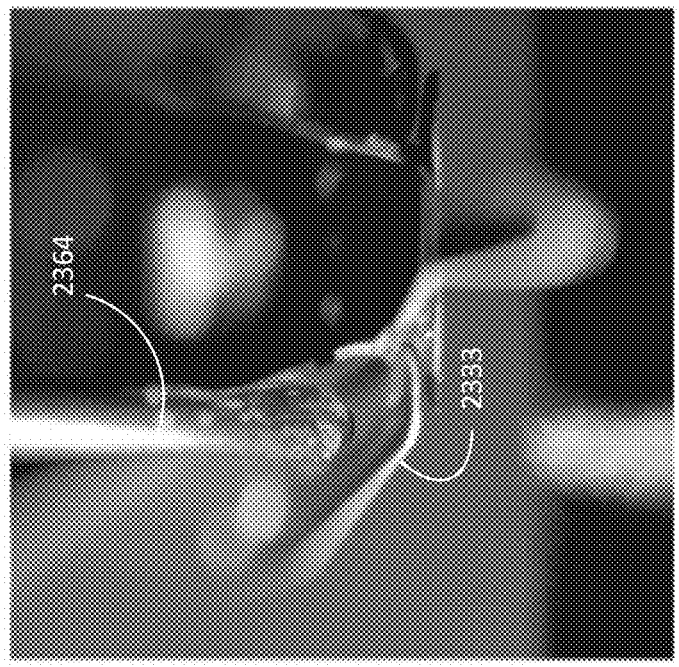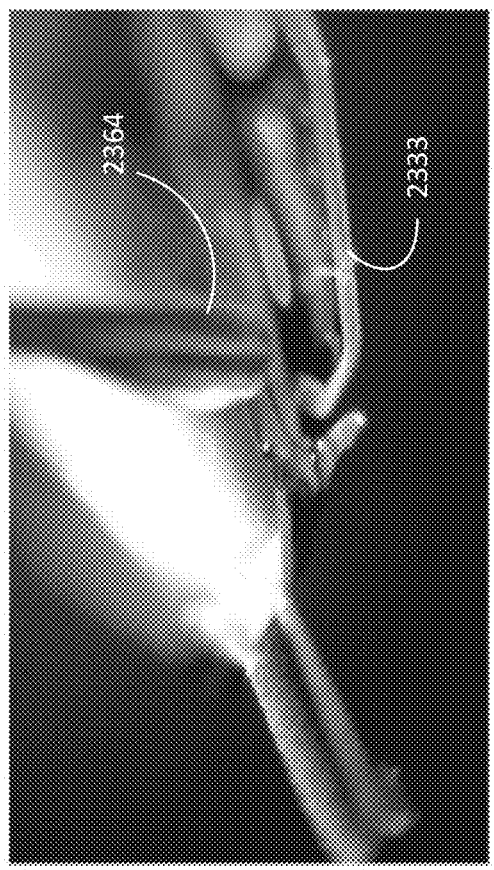
FIG. 23

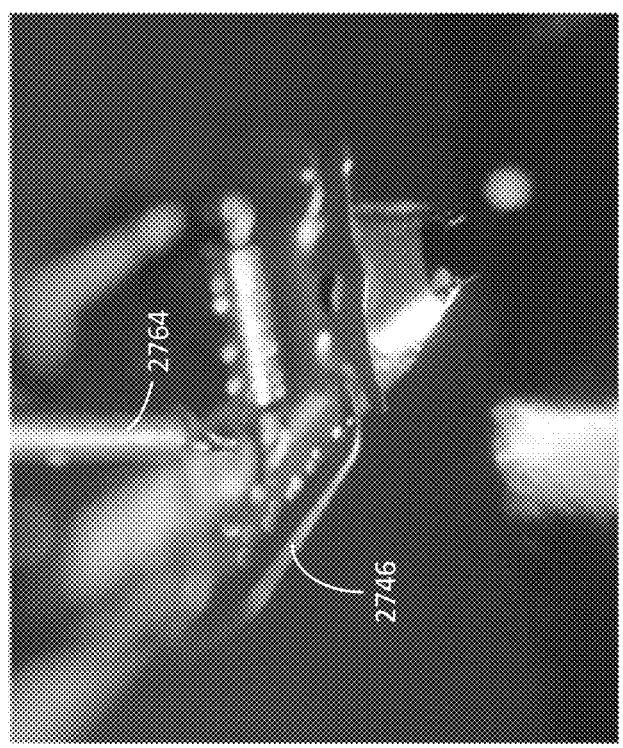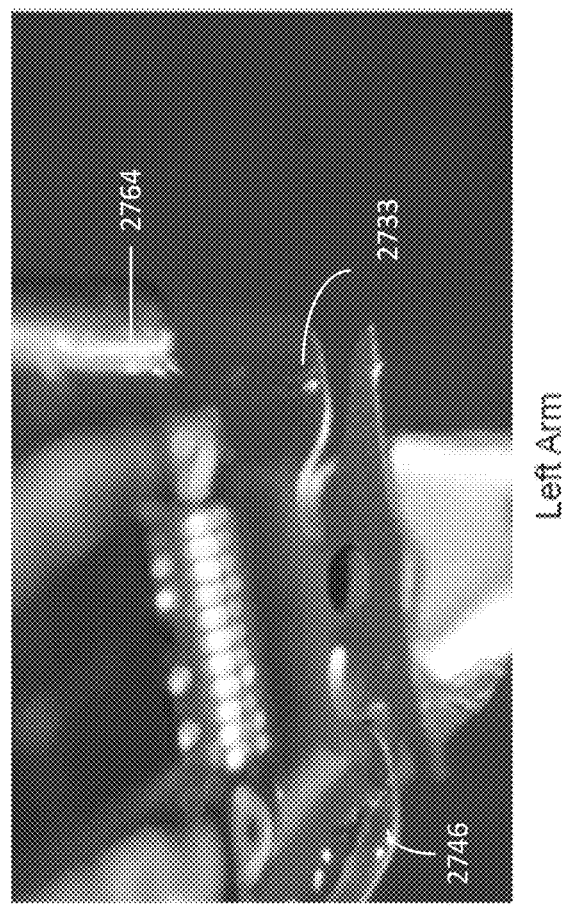
FIG. 27

Scoring of the Current Material Candidates

| Material | Criteria | Criteria Value | Criteria Weight | Score (0-10) | Weighted Score | Overall Material Score (0-10) |
|---|---|---|---|---|---|---|
| RTV Silicone | Dispensability | NA | 40% | 10 | 4 | 5.2 |
| | Damping Coefficient | 0.09 @ 25 °C and 1.06 kHz | 40% | 2 | 0.8 | |
| | Storage Modulus (G') | 0.42 MPa @ 25 °C and 1.06 kHz | 20% | 2 | 0.4 | |
| Sylgard 184 | Dispensability | NA | 40% | 6 | 2.4 | 5 |
| | Damping Coefficient | 0.25 @ 25 °C and 1.2 kHz | 40% | 6 | 2.4 | |
| | Storage Modulus (G') | 0.76 MPa @ 25 °C and 1.2 kHz | 20% | 1 | 0.2 | |
| EcoFlex 00-10 | Dispensability | NA | 40% | 8 | 3.2 | 9.2 |
| | Damping Coefficient | 0.39 @ 25 °C and 1.02 kHz | 40% | 10 | 4 | |
| | Storage Modulus (G') | 0.06 MPa @ 25 °C and 1.02 kHz | 20% | 10 | 2 | |

FIG. 28

HEAD GIMBAL ASSEMBLY WITH DAMPING MATERIAL

This application claims the benefit of U.S. Provisional Patent Application Ser. No. 63/004,854 (filed Apr. 3, 2020), which is entitled, "HEAD GIMBAL ASSEMBLY" and is incorporated by reference herein in its entirety.

TECHNICAL FIELD

The present disclosure relates to a head gimbal assembly in a hard disc drive.

BACKGROUND

Hard disc drives are data storage devices which utilize magnetic media to store and retrieve digital data. A disc coated with magnetic material is paired with a magnetic read/write head. The hard disc drive positions the magnetic read/write head over the disc to read and write data to the disc surface. Data is written by magnetizing a thin film of a ferromagnetic material on the disc surface. Data is read from the disc by detecting transitions in magnetization.

SUMMARY

In general, the disclosure describes a head gimbal assembly including a suspension and a layer on a surface of the suspension. The layer includes a damping material (e.g., a material selected to damp selected mechanical frequencies experienced by the suspension during use of the head gimbal assembly). The suspension is configured to establish mechanical communication with a motor arm of a motor, and configured to establish mechanical communication with a slider and a read/write head. In some examples, the suspension includes a slider mount configured to establish the mechanical communication with the slider and the read/write head, and the layer is laterally and/or vertically displaced from the slider mount. In some examples, the suspension includes a strength beam having a midsection between a first end and a second end attached to the slider mount, and the strength beam includes the surface.

The layer may include a viscoelastic material. In examples, the layer includes at least one of a silicone-comprising material, an elastomer, a thermosetting polymer, and a thermoplastic polymer. In some examples, the layer has a thickness (measured substantially perpendicular to the surface) of less than about 500 microns. In example, the layer may have a thickness less than about 200 microns. The layer may comprise one or more individual layers, such as a first individual layer, a second individual layer atop the first individual layer, a third individual layer atop the second individual layer, a fourth individual layer atop the third individual layer, and so on.

A technique for depositing a layer on a head gimbal assembly may include depositing a layer on a surface of a suspension configured to establish mechanical communication with a motor arm of a motor and configured to establish mechanical communication with a slider and a read/write head of the head gimbal assembly. The layer may include a damping material. In some examples, the technique may include limiting a thickness of the layer to less than 500 microns, where the thickness is measured perpendicular to the surface. The technique may include limiting a thickness of the layer to less than 200 microns. In examples, depositing the layer includes 3-D printing the layer on the head gimbal assembly.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a series of images showing multiple views of an example head gimbal assembly.

FIG. 6 is a table illustrating layer thicknesses for a variety of samples.

FIG. 10 provides a statistical analysis model and the corresponding parameters.

FIG. 12 is a plot illustrating frequency response functions (FRF) over a frequency range for a first and second example head gimbal assembly.

FIG. 13 is a series of images illustrating samples on a first and second example head gimbal assembly.

FIG. 22 is a series of images showing multiple views of an example head gimbal assembly.

FIG. 23 is a set of images showing views of a nozzle positioned to 3-D print a layer of damping material on a surface.

FIG. 27 is a set of images showing a view of a nozzle positioned to 3-D print a layer of damping material on a surface.

FIG. 28 is a table illustrating the evaluation metrics for RTV Silicone, SYLGARD 184, and ECOFLEX 00-10.

DETAILED DESCRIPTION

Figure 1:
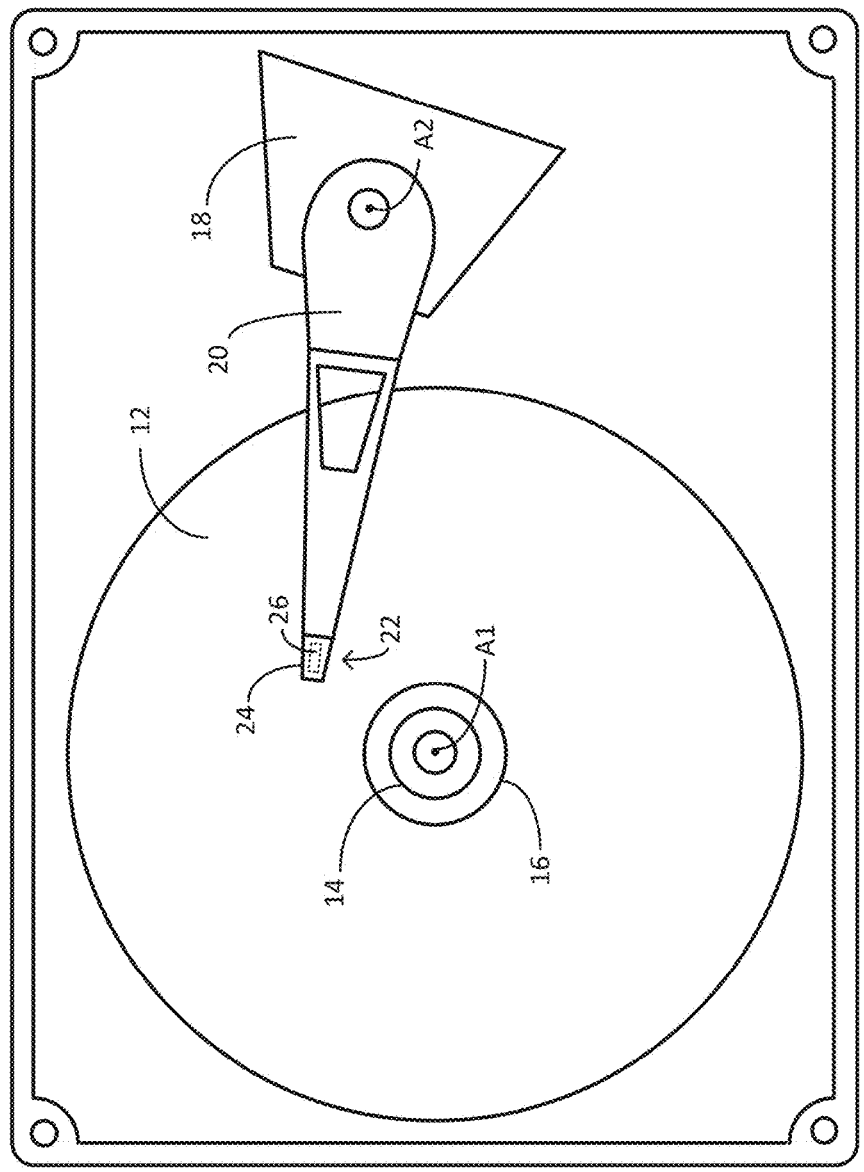
FIG. 1 is a schematic drawing of an example hard disc drive.

The disclosure describes articles, systems, and techniques relating to a head gimbal assembly for a hard disc drive. The head gimbal assembly described herein may be utilized to decrease vibrations of the head gimbal assembly while the disc of the hard disc drive rotates relative to the head gimbal assembly. For example, the described head gimbal assembly may be utilized to dampen vibrations associated with the interaction of an air bearing separating the head gimbal assembly from a surface of the rotating disc. Use of the head gimbal assembly disclosed may reduce variations in the fly height of the head gimbal assembly above the disc surface, potentially improving the write/read operations and/or data density of a hard disc drive system.

Hard disc drives contain magnetic heads which write and read information by magnetizing and sensing the magnetic fields of a disc surface. Typically the magnetic head is part of a head gimbal assembly ("HGA") connected to an actuator arm by a suspension. Motion of the actuator arm is controlled by a motor which acts to position the actuator arm and magnetic head over the disc surface.

The HGA typically includes a slider configured to carry the magnetic head over the disc surface using an air bearing. During operation, the disc rotates at relatively high speeds, resulting in a flow of air between the slider and the disc surface. This air flow generates a pressure profile on the air bearing causing the slider to effectively fly above the disc surface and maintain a separation between the disc surface and the HGA. The thickness of the air bearing is commonly referred to as "fly height." Typically, the fly height is 10 nm or less.

The airflow caused by the spinning disc is typically turbulent and may generate pressure fluctuations below the air bearing. During operation, these fluctuations may cause structural vibrations and resonance excitations in the HGA, resulting in variations of the fly height operation of the drive. This may adversely impact the exchange of magnetic signals between the HGA and the disc, leading to poor writing and reading of data.

The head gimbal assembly described herein includes a suspension configured to establish mechanical communication with a motor arm of a motor in a hard disc drive system. The suspension is further configured to establish mechanical communication with a slider and a read/write head of the head gimbal assembly. A layer is on a surface of the suspension. The layer may include a damping material, such as a viscoelastic material having a relatively low Young's modulus, a relatively high damping coefficient, and a relatively high failure strain. In some examples, the layer may include an elastomer, a silicone-comprising material, a thermosetting resin, a thermoplastic polymer, or other material.

As used here, mechanical communication between a first constituent and a second constituent means a movement of, a vibration in, and/or a force on the first constituent results in a movement of, a vibration in, and/or a force on the second component.

The layer may be configured to dampen vibrations arising in the head gimbal assembly due to, for example, the air flow between an air bearing of the head gimbal assembly and a rotating disc of a hard disc drive. The layer may be configured to reduce an amplitude of one or more vibrations occurring at a resonance frequency of one or more components of the head gimbal assembly. The one or more vibrations may amplify when the air bearing of a head gimbal assembly establishes a fly height in response to a disc rotating at a spin rate. In examples, the layer includes a first layer and a second layer atop the first layer, such that the first layer is between the surface and the second layer. In some examples, the layer has a thickness of less than 500 microns, and in other examples, less than 200 microns.

The suspension of the head gimbal assembly may define a slider mount configured to establish the mechanical communication between the slider and the read/write head. The layer may be present (e.g., in contact with and/or deposited) on any portion of the head gimbal assembly. In examples, the layer is present (e.g., in contact with and/or deposited) on a portion of the suspension displaced from the slider mount. In some examples, the suspension incudes a strength beam having a first end and a second end attached to the slider mount, and layer is present on a surface of the strength beam. The strength beam may include a midsection between the first end and the second end and displaced from the slider mount. In examples, the strength beam may be a first strength beam and the suspension may include a second strength beam, and the layer may be present (e.g., in contact with and/or deposited) on a surface of the first strength beam and a surface of the second strength beam. In examples, the head gimbal assembly includes a lower side configured to face the disc surface of the hard disc drive and an upper side opposite the lower side (e.g., configured to face away from the disc surface of the hard disc drive), and the layer is on at least one of the upper side of the head gimbal assembly or the lower side of the head gimbal assembly.

The layer may be deposited on the surface using any suitable technique. In examples, the layer is 3-D printed on the surface, which may facilitate precise manufacturing at relatively low cost and relatively high speed. For example, the damping material may be dissolved or suspended in a solvent and the solvent may be dispensed from a nozzle at selected locations of the head gimbal assembly. After being dispensed on the head gimbal assembly, the solvent may be removed (e.g., evaporated) and the damping material may optionally be cured, e.g., using heat, radiation, exposure to a chemical, or during the drying process. In some examples, multiple layers of damping material may be deposited (e.g., 3-D printed) to define the total thickness of damping material at a selected location. Earlier-deposited layers may or may not be cured before printing of subsequent layers.

FIG. 1 is a plan view of an example disc drive 10. Disc drive 10 includes a disc 12 mounted on a spindle motor 14 by a disc clamp 16. Spindle motor 14 drives rotation of disc 12 around an axis A1 (substantially perpendicular to the page). A motor 18 is mechanically connected to motor arm 20 and configured to position motor arm 20 over disc 12. For example, motor 18 may be a voice coil motor (VCM) causing motor arm 20 to pivot around axis A2 (substantially perpendicular to the page). A head gimbal assembly 22 ("HGA 22") is mechanical connected to an end (e.g., an end distal to motor 18) of motor arm 20 and includes suspension 24 and slider mount 26. FIG. 1 illustrates slider mount 26 in hidden lines underneath suspension 24 (e.g., facing hard disc 12). Slider mount 26 supports a slider (not shown) including an air bearing configured to establish a fly height when disc 12 rotates and causes a flow of air between the slider and disc 12.

Motor 18 moves motor arm 20 to position HGA 22 over a desired data track of disc 12 under the control of electronic circuitry housed within disc drive 10 as spindle motor 14 rotates disc 12. As disc 12 rotates, the slider floats on the magnetic disc by balancing the pressure of the air between the slider and the rotating magnetic disc. Disc 12 may be one of a plurality of individual discs which to rotate about axis A1, with each disc having components similar to motor arm 20 and HGA 22.

Figure 3:
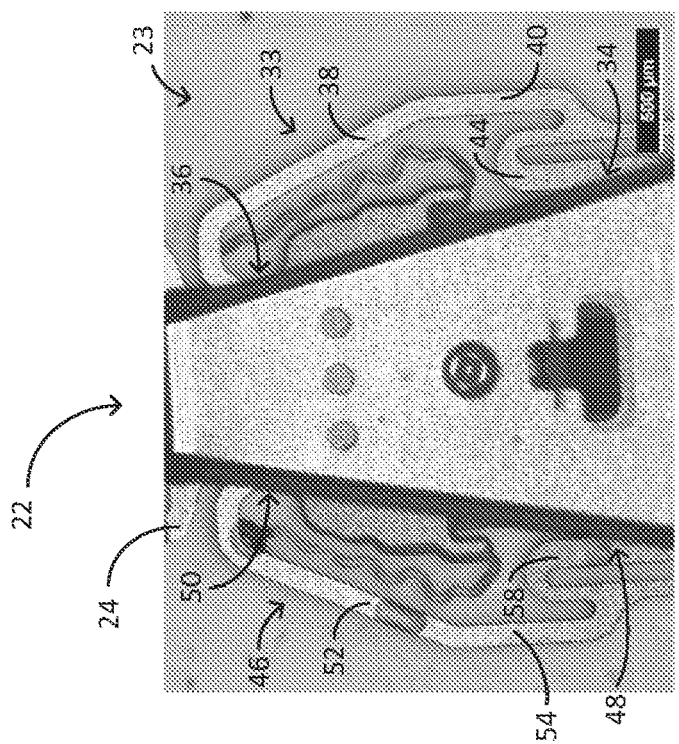
FIG. 3 is a micrograph illustrating an upper side of an example head gimbal assembly.
Figure 2:
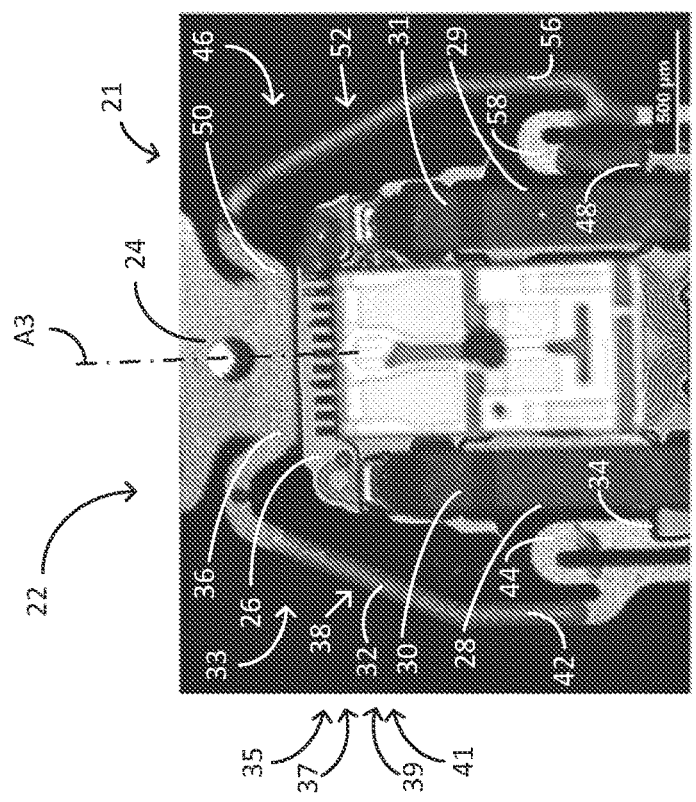
FIG. 2 is a micrograph illustrating a lower side of an example head gimbal assembly.

FIG. 2 illustrates a lower side 21 of an example HGA 22 illustrating suspension 24, slider mount 26, and slider 28, and air bearing 30. HGA 22 is configured such that when air bearing 30 substantially faces disc 12 and disc 12 rotates sufficiently to cause an air stream between air bearing 30 and disc 12, air bearing 30 causes HGA 22 to float above disc 12. HGA 22 may further include slider 29 and air bearing 31, which may be configured similarly to slider 28 and air bearing 30 respectively FIG. 3 illustrates an upper side 23 of HGA 22 opposite the lower side 21. HGA 22 may be configured on suspension 24 of disc drive 10 (FIG. 1) such that upper side 23 faces away from disc 12 and lower side 21 faces toward disc 12 when slider mount 26 supports slider 28 of HGA 22. In some examples, some portion of HGA 22 is configured to flex and/or rotate substantially around an axis A3 intersecting suspension 24 when HGA 22 is mechanically connected to motor arm 20.

HGA 22 includes a layer 32 on (e.g., in contact with) a surface of suspension 24. Layer 32 includes a damping material that is configured to dampen vibrations arising in HGA 22 due to air flow between air bearing 31 and a rotating disc 12 of hard disc drive 10 (FIG. 1), and/or vibrations arising from other operations of hard disc drive 10. Although the configuration of layer 32 may be mainly discussed and illustrated with respect to suspension 24 in the following examples, it is understood that layer 32 may reside on (e.g., be in contact with) with any surface of HGA 22 in other examples, Layer 32 may include any material. In examples, layer 32 includes a viscoelastic material having a relatively low Young's modulus, a relatively high damping coefficient, and a relatively high failure strain. In some examples, layer 32 includes an elastomer, a silicone-comprising material such as ECOFLEX 00-10 (Smooth-On Inc., Macungie, PA, USA), SYLGARD 184 (Dow Chemical Co., Midland, ML, USA), LOCTITE SI 595 (Henkel AG & Co., Dusseldorf, DE), and/or others. In some examples, layer 32 may include a thermosetting resin, a thermoplastic polymer, a composite, or other material. Layer 32 may include a material configured to cure from a substantially liquid state (e.g., having a low viscosity) on the surface to a substantially solid state (e.g., having a higher viscosity) on the surface. The material of layer 32 may cure with or without requiring an additive. Layer 32 may adhere to the surface of suspension 24 or any surface of HGA 22. In some examples, the material (e.g., the material composition) of layer 32 may be adjusted by including additives to optimize the rheological properties for printing (e.g., viscosity), curing rate (e.g., retarder), or damping performance.

Layer 32 may be configured to conduct passive damping, active damping, or a combination of passive and active damping. In some examples, such as when layer 32 is configured to conduct active damping, a head gimbal assembly (e.g., HGA 22) may include an electrical lead configured to provide electrical communication with layer 32. For example, the electrical lead may be configured as a top electrical contact on an exterior surface of layer 32. Layer 32 may be configured to receive an electrical signal from the electrical lead (e.g., the top electrical contact) at a first portion of layer 32 and conduct at least some portion of the electrical signal to other portions of layer 32. Layer 32 may comprise a material having electrical properties which allows layer 32 to receive the electrical signal from the electrical lead and/or conduct at least some portion of the electrical signal to other portions of layer 32. A head gimbal assembly (e.g., HGA 22) may include processing circuitry configured to provide electrical signals to layer 32 in order to actively dampen vibrations of the head gimbal assembly. The processing circuitry may be configured to receive signals from sensors and/or actuators configured to determine vibrational parameters within layer 32.

In examples, layer 32 includes one or more of a polymer with embedded particles (e.g., inorganic particles, nanoparticles, nanotubes, nanowires, and/or microspheres, etc), a piezoelectric material, device, and/or polymer, a shape-memory material (e.g., a polymer and/or a metal), a liquid crystal and/or liquid crystal polymer, an ionic liquid, an ionic polymer-metal composite, and/or a hydrogel.

The surface where layer 32 is present (e.g., in contact with) may include any portion of suspension 24. In examples, such as illustrated at FIGS. 2 and 3, layer 32 is present on a portion of suspension 24 displaced (e.g., laterally displaced and/or vertically displaced) from slider mount 26. Layer 32 may be configured on suspension 24 to dampen the amplitude of one or more resonant frequencies during operations of hard disc drive 10 (FIG. 1). In some examples, layer 32 is configured to damp one or more resonant frequencies which amplify when HGA 22 is positioned over disc 12 and disc 12 rotates around axis A1 at a particular spin rate (e.g., an RPM). The portion of suspension 24 where layer 32 is present may be based on available access to the portion during construction, avoidance of interference with other components of HGA 22, ease of depositing layer 32 during a deposition process, or some other reason. In examples, the portion of suspension 24 where layer 32 is located may be based on modifying and/or altering a mechanical resonance of HGA 22 (e.g., modifying and/or altering the resonant frequencies of HGA 22). The portion of the surface covered by layer 32 may include portions of HGA 22 on upper side 23, lower side 21, or both upper side 23 and lower side 21.

In some examples, layer 32 may include a first individual layer and a second individual layer, with the first individual layer on the surface and the second individual layer atop the first individual layer, such that the first individual layer is between the second individual layer and the surface. An interface layer may separate the first individual layer and the second individual layer, although the interface layer is not included in all examples. Layer 32 may include one or more additional individual layers atop the second individual layer, such as a third individual layer atop the second layer, and a fourth individual layer atop the third layer. In examples, layer 32 (including the first individual layer, second individual layer, third individual layer, fourth individual layer, and other layers as applicable) has a thickness measured substantially perpendicular to the surface of less than about 500 microns. In some examples, one or more of the first individual layer, the second individual layer, the third individual layer, or the fourth individual layer have an individual thickness of less than about 100 microns. In examples, the individual thickness is less than 60 microns.

In examples, layer 32 is configured as a free-layer damping material having a substantially consistent Young's modulus throughout layer 32. In examples, a first individual layer and a second individual layer comprising layer 32 have a substantially similar Young's modulus, such that layer 32 generates free-layer damping. In some examples, a first individual layer has a first Young's modulus and a second individual layer has a second Young's modulus, and the first individual layer and the second individual layer causes layer 32 to generate constrained layer damping.

As discussed, layer 32 may be present on a portion of suspension 24 displaced (e.g., laterally displaced and/or vertically displaced) from slider mount 26. For example, FIGS. 2, 3 illustrates a strength beam 33 having a first end 34 and a second end 36 separating a mid-section 38. First end 34 and second end 36 are attached to slider mount 26, with mid-section 38 displaced from slider mount 26. Strength beam 33 has a first side 40 ("beam first side 40") configured on HGA 22 to face in a direction away from disc 12 (e.g., in a similar facing direction of upper side 23) when HGA 22 is mechanically connected to motor arm 20. A second side 42 of strength beam 33 ("beam second side 42") is substantially opposite beam first side 40. Beam second side 42 is configured on HGA 22 to face in a direction toward from disc 12 (e.g., in a similar facing direction of lower side 21) when HGA 22 is mechanical connected to motor arm 20. In some examples, at least second end 36 is configured to flex and/or rotate substantially around axis A3 when HGA 22 flexes and/or rotate substantially around axis A3. Layer 32 may be present on (e.g., in contact with) any portion or substantially all of strength beam 33.

In some examples, strength beam 33 includes a curved section 44 having an inflection from a first curvature to a second curvature. For example, curved section 44 may substantially define an S-shaped curvature having a spline joining a first curved portion and a second curved portion. In examples, at least one of the first curved portion or the second curved portion is coplanar with slider mount 26. In other examples, first curved portion and/or second curved portion may have other orientations with respect to slider mount 26.

HGA 22 may include a second strength beam 46 including first end 48, second end 50, mid-section 52, first side 54, second side 56, and curved section 58, which may be configured similarly to and operate relative to the components of HGA 22 in the same manner as the like-named components of strength beam 33. Layer 32 may be present on any portion or substantially all of strength beam 33.

Figure 4:
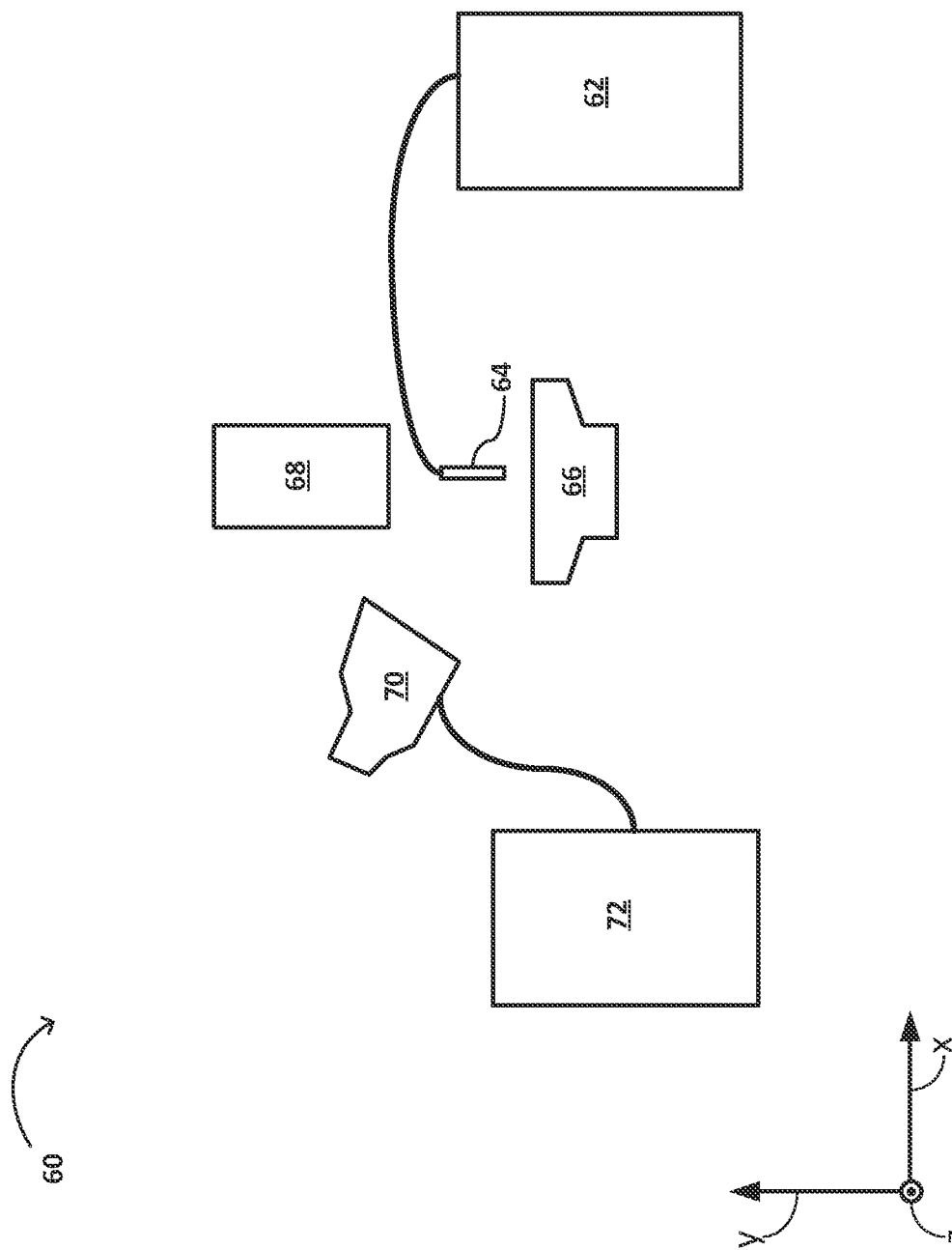
FIG. 4 is an image illustrating an example system for depositing a layer of damping material on a head gimbal assembly.

A system 60 for depositing layer 32 on HGA 22 is illustrated at FIG. 4 System 60 may utilize a dispensing system 62 in fluid communication with a nozzle 64. Dispensing system 62 may be configured to deliver a material of layer 32 to one or more nozzles 64, such that the one or more nozzles 64 may issue the material onto a surface of HGA 22. System 60 may include processing circuitry configured to deposit layer 32 using 3-D printing techniques.

System 60 may include one or more trackers configured to track and/or control a motion of nozzles 64 in order to deposit layer 32 on HGA 22. For example, system 60 may include a horizontal tracker 66 having processing circuitry configured to track and/or position nozzles 64 in a horizontal plane. Horizontal tracker 66 may be configured to track and/or position nozzles 64 in the x-z plane of the x-y-z axes depicted (where the z-axis is perpendicular to the page).

System 60 may include a vertical tracker 68 having processing circuitry configured to track and/or position nozzles 64 in a vertical direction. For example, vertical tracker 68 may be configured to track and/or position nozzles 64 in the y direction of the x-y-z axes depicted. System 60 may be configured to control a flow rate of a material issuing through nozzles 64 while system 60 deposits layer 32 on the surface of HGA 22. System 60 may be configured to deposit layer 32 by depositing one or more individual layers on the surface of HGA 22. In some examples, system 60 is configured to control a flow rate of material issuing through nozzles 64 such that layer 32 has a thickness of less than about 500 microns on the surface of HGA 22. In some examples, system 60 controls a flow rate of material such that layer 32 has a thickness of less than about 200 microns. System 60 may be configured to control a flow rate of material such that one or more individual layers (e.g., a first layer 35, second layer 37, third layer 39, or fourth layer 41) comprising layer 32 has an individual thickness less than about 100 microns. In examples, the individual thickness is less than 60 microns.

System 60 may include an imaging system 70 for producing a visual image of HGA 22 as nozzles 64 deposit a material on the surface of HGA 22. Imaging system 70 may include a camera and processing circuitry configured to communicate with horizontal tracker 66 and/or vertical tracker 68 to track and/or position nozzles 64. In some examples, system 60 may be an apparatus configured to emit and/or provide an energy (e.g., light, heat) or substance utilized for curing the material within layer 32. For example, system 60 may include UV generator 72.

The processing circuitry of system 60, in some examples, may include one or more processors that are configured to implement functionality and/or process instructions stored in a storage device. The processing circuitry may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the processing circuitry of system 60 may include any suitable structure, whether in hardware, software, firmware, or any combination thereof, to perform the functions ascribed herein to the processing circuitry. In examples, the processing circuitry is located within the housing of one or more external devices. As such, techniques and capabilities attributed herein to the processing circuitry of system 60 may be attributed to any combination of external devices. An external device may be, for example, any fixed or mobile computer system (e.g., a controller, a microcontroller, a personal computer, minicomputer, tablet computer, etc.) and may be generally described as including substantially all or some portion of the processing circuitry. The storage device may include a computer-readable storage medium or computer-readable storage device and may include one or more of a short-term memory or a long-term memory. The storage device may include, for example, RAM, DRAM, SRAM, magnetic discs, optical discs, flash memories, or forms of EPROM or EEPROM. In examples, the storage device is used to store data indicative of instructions for execution by the processing circuitry of system 60.

In some examples, a technique includes modifying a head gimbal assembly by depositing (e.g., 3-D printing) layer 32 on a surface (e.g., a surface of suspension 24) of the head gimbal assembly. Suspension 24 may be configured to establish mechanical communication with motor arm 20 of motor 18 and configured to establish mechanical communication with slider 28 of the head gimbal assembly. The technique may include depositing layer 32 on upper side 23 of the head gimbal assembly. The technique may include limiting a thickness of layer 32 to less than 100 microns, wherein the thickness is perpendicular to the surface. For example, the technique may include controlling a rate of material that dispensed from a nozzle of a 3-D printer, utilizing a 3-D printing nozzle of a particular size, selecting a parameter using software controlling a 3-D printer, and the like. The technique may use any deposition process suitable for depositing all or a portion of layer 32 on a surface of the head gimbal assembly, such as sputtering, brushing, spraying, vapor depositions, electrochemical depositions, and others.

In examples, the technique includes depositing layer 32 on a portion of suspension 24 displaced from slider mount 26 defined by suspension 24. The technique may include depositing layer 32 on strength beam 33 having first end 34 attached to slider mount 26 and second end 36 attached to slider mount 26. The technique may include depositing layer 32 on midsection 38 of strength beam 33 between first end 34 and second end 36. The technique may include depositing layer 32 on strength beam 46 having first end 48 attached to slider mount 26 and second end 50 attached to slider mount 26. In examples, the technique includes depositing layer 32 on strength beam 33 and/or strength beam 46 on curved section 44 having a first curved portion and a second curved section.

The technique may include issuing a material through a nozzle 64 in fluid communication with a dispensing system 62 in order to deposit layer 32. The technique may include issuing the material as a fluid from nozzle 64 and causing the material to cure into a viscoelastic material. In examples, the technique includes issuing at least one of a silicone-comprising material, an elastomer, a thermosetting polymer, and a thermoplastic polymer from nozzle 64. In some examples, the technique includes issuing at least one of an RTV silicone, ECOFLEX 00-10, and SYLGARD 184.

The technique may include moving nozzle 64 over the head gimbal assembly in order to 3-D print layer 32. In examples, a horizontal tracker 66 may be utilized to position nozzle 64 in an x-z plane. A vertical tracker 68 may be utilized to position nozzle 64 in y direction perpendicular to the x-z plane. The technique may include controlling a flow rate of the material issuing through nozzle 64 to control the thickness of layer 32. The technique may include limiting a thickness of layer 32 to less than 500 microns. In some examples, the technique includes depositing at least a first individual layer on the surface of the head gimbal assembly, and depositing a second individual layer on the first layer, such that the first individual layer is between the second individual layer and the surface. The technique may include depositing a third individual layer atop the second individual layer, and may include depositing a fourth individual layer atop the third individual layer. The technique may include curing the first individual layer prior to depositing the second individual layer, curing the second individual layer prior to depositing the third individual layer, and/or curing the third individual layer prior to depositing the fourth individual layer. The technique may include depositing any number of individual layers (e.g., a first layer, a second layer, third layer, and a fourth layer) in order to deposit layer 32 on the surface of the head gimbal assembly. The technique may include limiting an individual thickness of one or more of the first individual layer or the second individual layer to less than 100 microns. In examples, the technique includes limiting the individual thickness to less than 60 microns.

The technique may include utilizing an imaging system 70 to track nozzle 64 and/or obtain a visual image of the head gimbal assembly. The technique may include utilizing an energy-emitting apparatus to cure the material of layer 32.

In some examples, the technique includes using processing circuitry to cause nozzle 64 to position over the head gimbal assembly. The technique may include using processing circuitry to cause dispensing system 62 to control a flowrate of a material through nozzle 64 The technique may include using processing circuitry to cause nozzle 64 to 3-D print a first layer on the surface of the head gimbal assembly, and cause nozzle 64 to 3-D print a second layer on the first layer.

Although the technique is mainly described with reference to 3-D printing using a 3-D printer, layer 32 may be deposited on and/or placed in contact with a surface of an HGA using other techniques in other examples.

In examples, one or more of dispensing system 62, nozzle 64, horizontal tracker 66, vertical tracker 68, imaging system 70, processing circuitry, and the energy-emitting apparatus may include one or more components in a 3-D printing system.

FIG. 5 is a series of images showing multiple views of an example head gimbal assembly. FIG. 5 provides multiple views of an example HGA 522 including a suspension, layer 532, strength beam 533, and strength beam 546. HGA 522, the suspension, layer 352, strength beam 533, and strength beam 546 may be examples of HGA 22, suspension 24, layer 32, strength beam 33, and strength beam 46 respectively.

FIG. 6 is a table illustrating layer thicknesses for a variety of samples. FIG. 6 illustrates a thickness of layer 32 for a variety of samples on a left arm (e.g., strength beam 33) and a right arm (e.g., strength beam 46) of an example head gimbal assembly. Thickness are measured in microns (µm) and represent a combined thickness of a first layer and a second layer forming layer 32.

Figure 7:
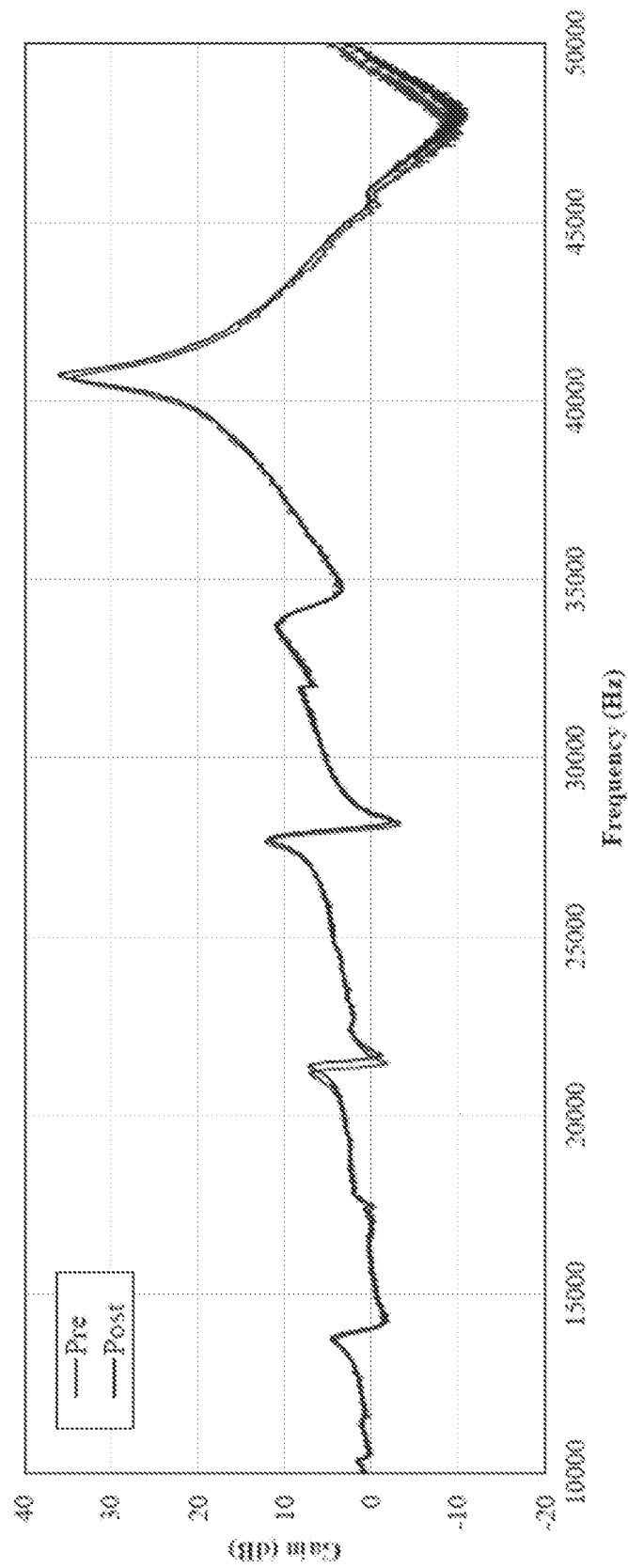
FIG. 7 is a plot illustrating frequency response functions (FRF) of an example head gimbal assembly.

FIG. 7 is a plot illustrating frequency response functions (FRF) of an example head gimbal assembly. FIG. 7 illustrates a frequency response functions (FRF) of an example head gimbal assembly as a control sample without layer 32 over a frequency range from 10000 Hertz (Hz) to 50000 Hz.

Figure 8:
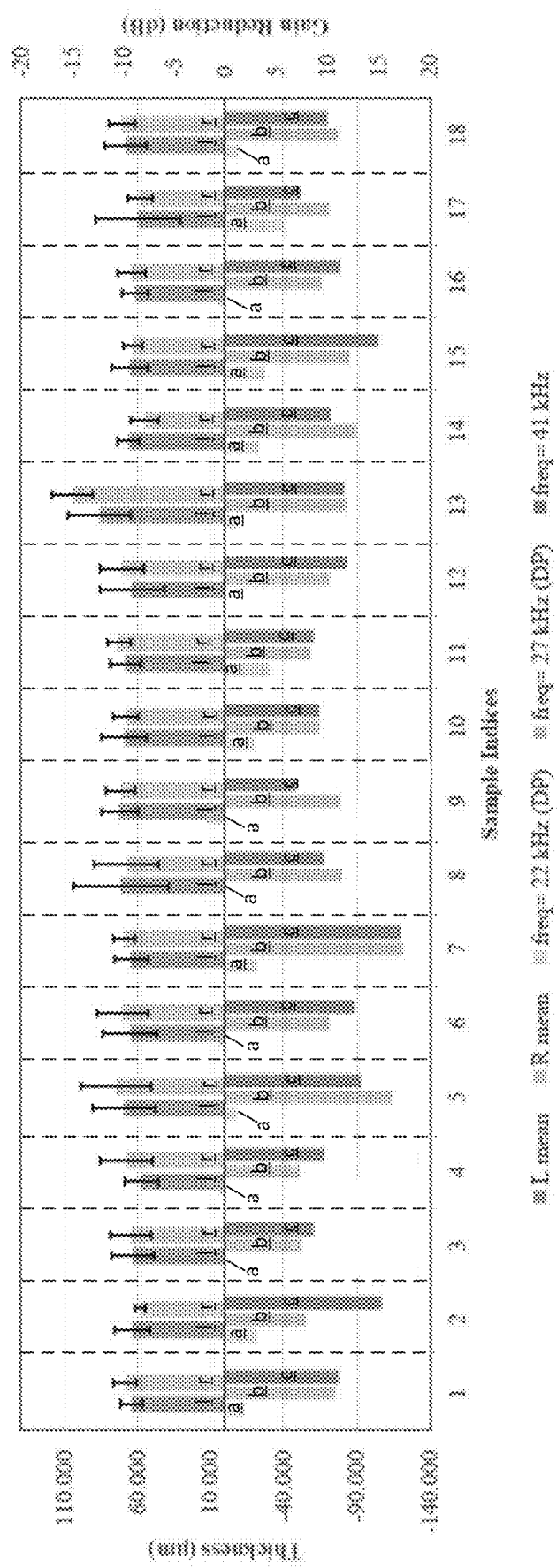
FIG. 8 is a plot illustrating gain reductions at selected frequencies for 18 examples of head gimbal assembly.

FIG. 8 is a plot illustrating gain reductions at selected frequencies for an example head gimbal assembly. FIG. 8 illustrates a plurality of gain reductions at selected frequencies based on thickness of layer 32 present on a left arm (e.g., strength beam 33) and a right arm (e.g., strength beam 46) of an example head gimbal assembly for a plurality of samples. Individual samples 1 through 18 are indicated by the axis labeled "Sample Indices." The thickness of layer 32 in microns is indicated on the axis labeled "Thickness (µm) for each of sample 1-8, with the designation l indicating the thickness on a left arm and the designation r indicating the thickness on a right arm for each sample. Gain reductions for each sample are indicated on the axis labeled "Gain Reduction (dB)," with the designation a indicating gain reduction at 22 kHz, the designation b indicating gain reduction at 27 kHz, and the designation c indicating gain reduction at 41 kHz for each sample.

Figure 9:
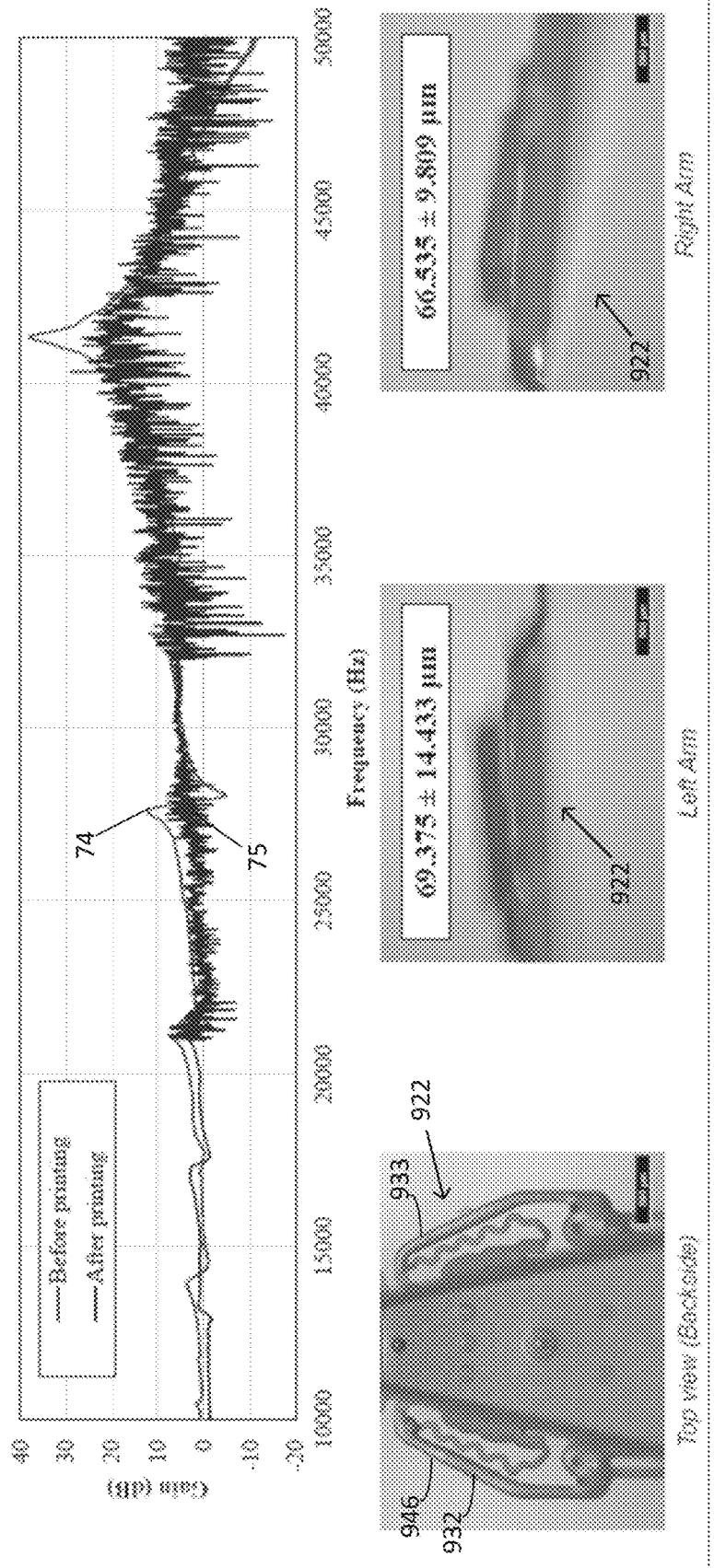
FIG. 9 is a plot illustrating frequency response functions (FRF) of an example head gimbal assembly and images of the example head gimbal assembly.

FIG. 9 is a plot illustrating frequency response functions (FRF) of an example head gimbal assembly and images of the example head gimbal assembly. FIG. 9 illustrates a frequency response function (FRF) of an example HGA 922 over a frequency range from 10000 Hertz (Hz) to 50000 Hz. Trace 74 represents the FRF without layer 32 on a left arm and a right arm of HGA 922 Trace 75 represents the FRF with layer 32 present at a mean thickness of 69.375 µm on the left arm and a mean thickness of 66.535 µm on the left arm. FIG. 9 additionally provides multiple views of HGA 922 including layer 932, strength beam 933, and strength beam 946. HGA 922, layer 952, strength beam 933, and strength beam 946 may be examples of HGA 22, layer 32, strength beam 33, and strength beam 46 respectively.

FIG. 10 provides statistical analysis parameters. FIG. 10 provides statistical analysis parameter definitions for input parameters of Thickness, Uniformity, and Asymmetry, an output parameter Gain Reduction, and a function using the input parameters and output parameters.

Figure 11:
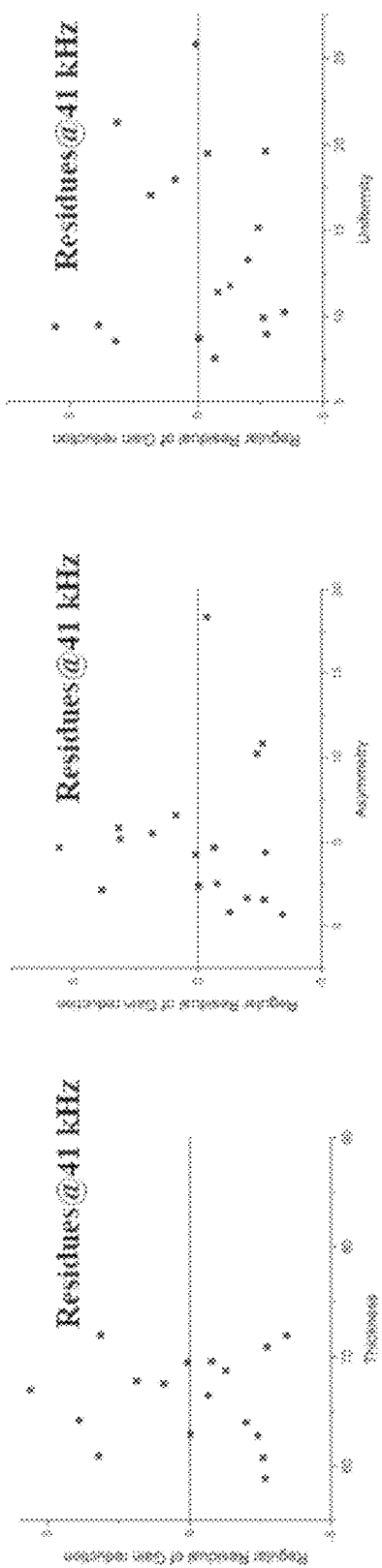
FIG. 11 includes a table and plots providing results for a layer deposited on 18 examples of head gimbal assemblies.

FIG. 11 includes a table and plots providing results for a layer deposited on an example head gimbal assembly. FIG. 11 provides a data analysis providing results for Thickness, Asymmetry, Uniformity, and Statistics for a layer 32 on an example head gimbal assembly, with results provided for frequencies of 41 kHz, 27 kHz, and 22 kHz.

FIG. 12 is a plot illustrating frequency response functions (FRF) over a frequency range for an example head gimbal assembly. FIG. 12 illustrates frequency response functions (FRF) over a frequency range from 10000 Hertz (Hz) to 50000 Hz for a first head gimbal assembly and a second head gimbal assembly. Trace 76 represents the FRF without layer 32 on the first head gimbal assembly, while trace 77 represents the FRF with layer 32 on a left arm with a mean thickness of 64.571 µm and on a right arm with a mean thickness of 69.226 µm. Gain reductions of −3.13 dB, −17.33 dB, and −17.09 dB are indicated over selected frequency ranges. Trace 78 represents the FRF without layer 32 on the second head gimbal assembly, while trace 79 represents the FRF with layer 32 on a left arm with a mean thickness of 63.169 µm and on a right arm with a mean thickness of 64.787 µm. Gain reductions of +0.35 dB, −17.48 dB, and −8.61 dB are indicated over selected frequency ranges.

FIG. 13 is a series of images illustrating samples on a first and second example head gimbal assembly. FIG. 13 provides microscopic images of sample 9 of FIG. 8 on a first example HGA 1322 including layer 1332, strength beam 1333, and strength beam 1346, and microscopic images of sample 3 of FIG. 8 on a second example HGA 1323 including layer 1335, strength beam 1336, and strength beam 1347. HGA 1322, layer 1332, strength beam 1333, and strength beam 1346 may be examples of HGA 22, layer 32, strength beam 33, and strength beam 46 respectively. HGA 1323, layer 1335, strength beam 1336, and strength beam 1347 may be examples of HGA 22, layer 32, strength beam 33, and strength beam 46 respectively.

Figure 14:
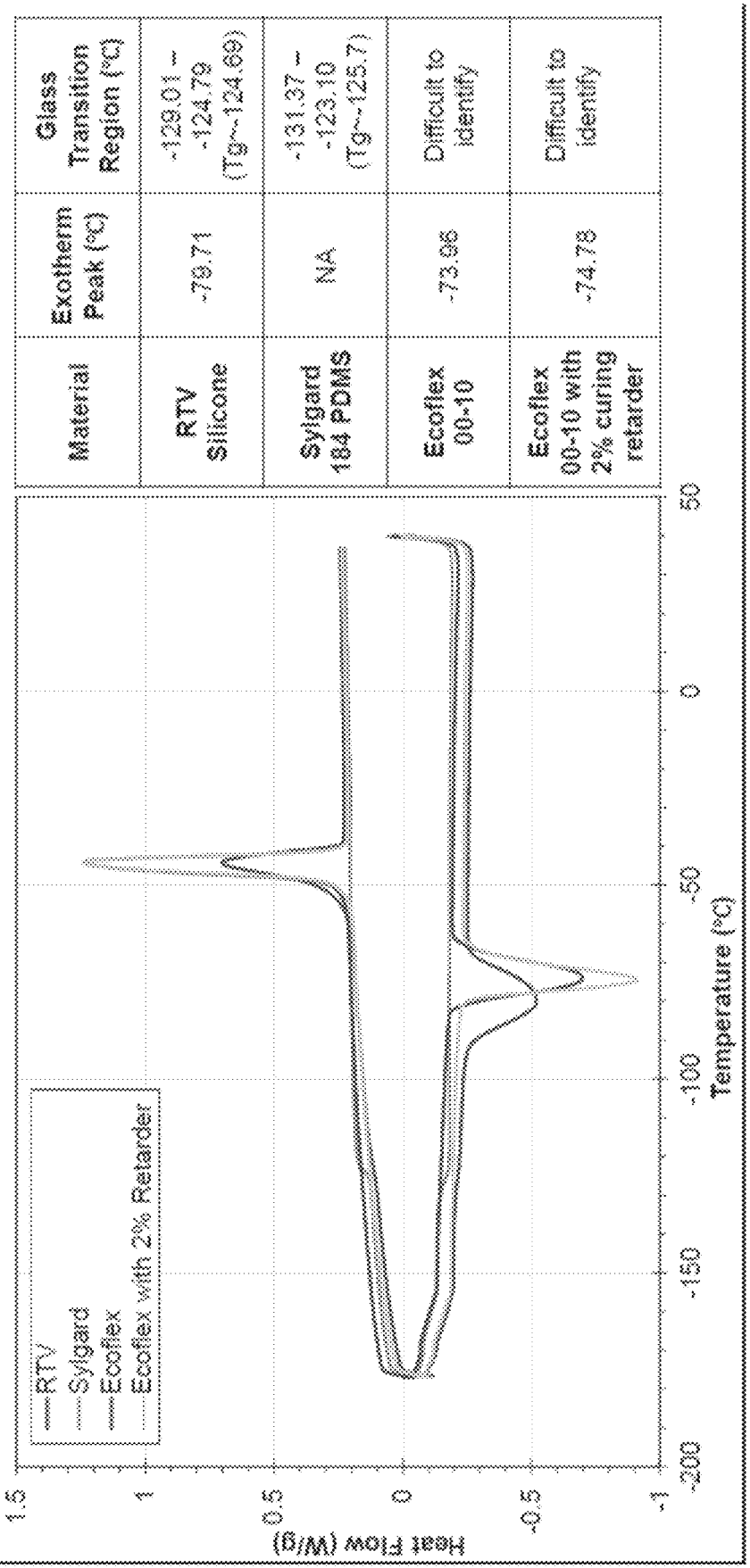
FIG. 14 is a plot of Differential Scanning Calorimetry results for selected materials.

FIG. 14 is a plot of Differential Scanning Calorimetry results for selected materials. FIG. 14 provides Differential Scanning Calorimetry results for selected materials of layer 32 including RTV, SYLGARD, ECOFLEX, and ECOFLEX with 2% Retarder.

Figure 15:
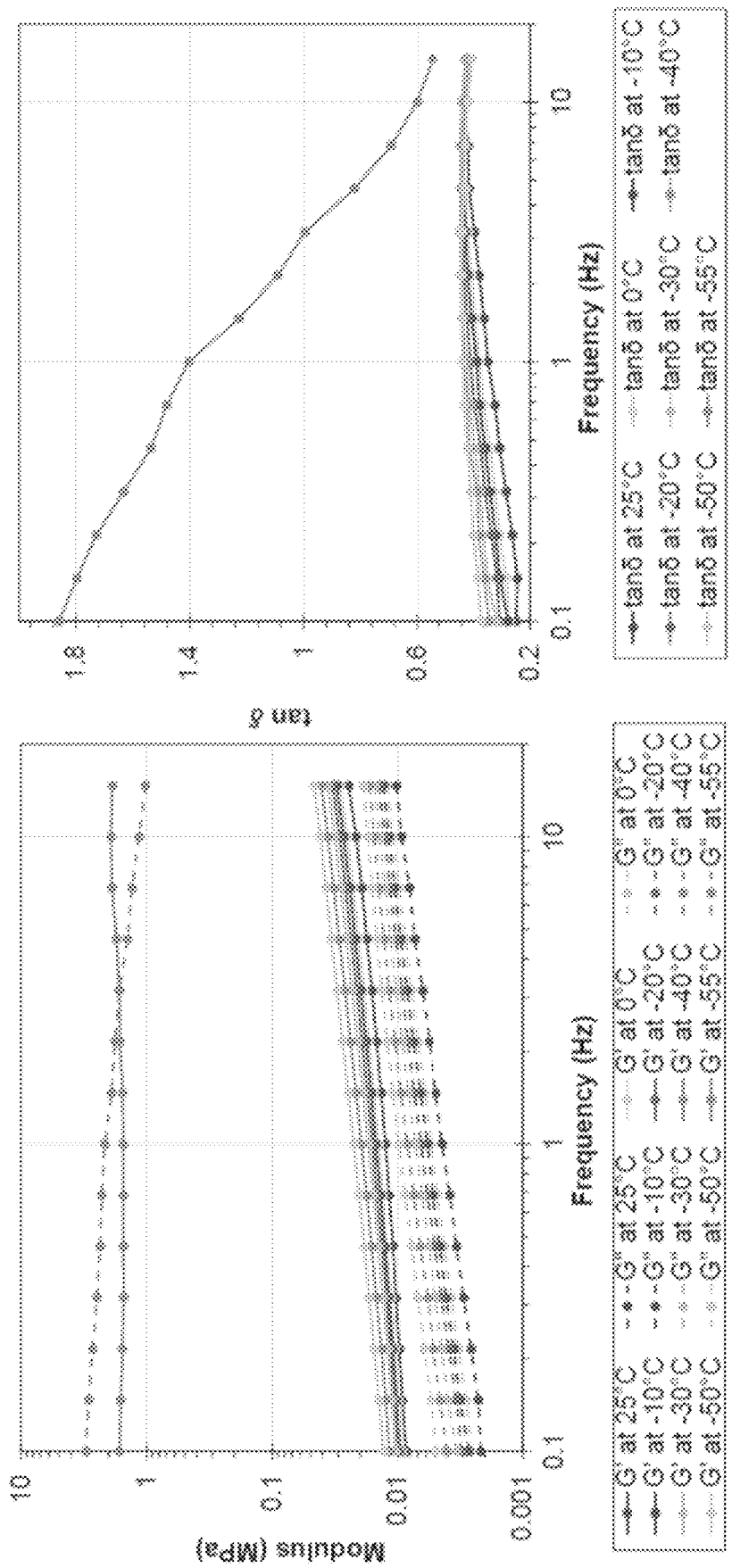
FIG. 15 is a plot characterizing of storage modulus (MPa), loss modulus, and damping coefficient (tan(delta)) for ECO-FLEX 00-10 over a range of frequencies and temperatures.

FIG. 15 is a plot characterizing of storage modulus (MPa), loss modulus, and tan(delta) for ECOFLEX 00-10 over a range of frequencies and temperatures.

Figure 16:
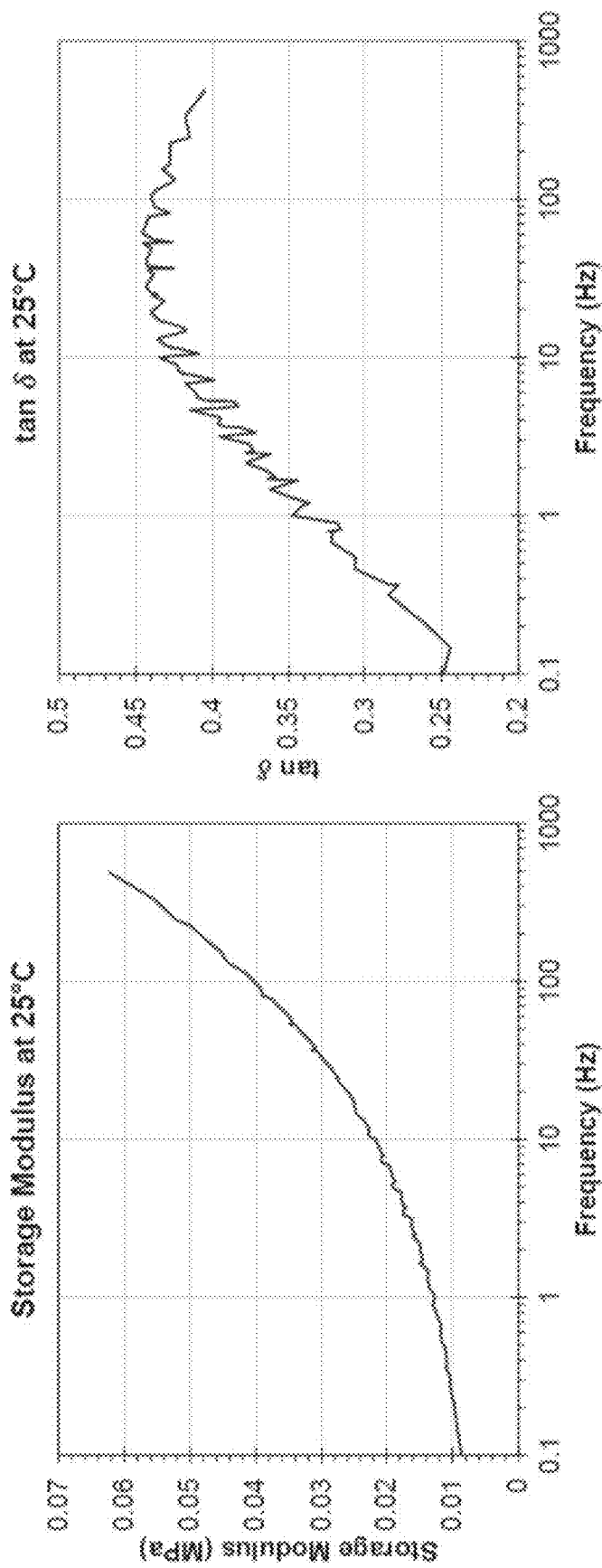
FIG. 16 illustrates two plots (of storage modulus and damping coefficient (tan(delta)) versus frequency) together showing a time-temperature superposition result for the ECOFLEX 00-10 of FIG. 15.

FIG. 16 illustrates two plots (of storage modulus and tan(delta) versus frequency) together showing a time-temperature superposition for the ECOFLEX 00-10 of FIG. 15.

Figure 17:
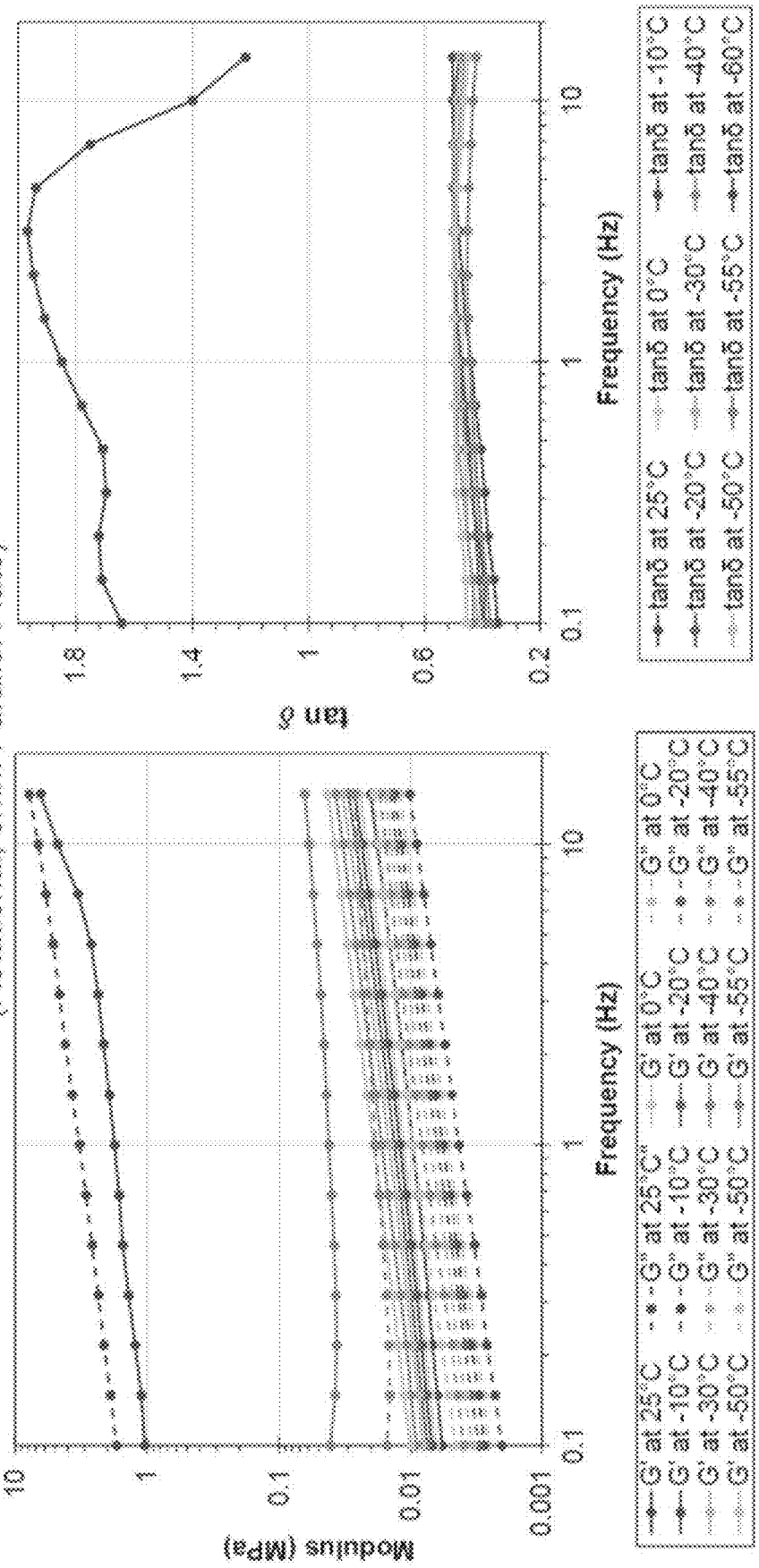
FIG. 17 is a plot characterizing of storage modulus (MPa), loss modulus, and damping coefficient (tan(delta)) for ECO-FLEX 00-10 with 2% retarder over a range of frequencies and temperatures.

FIG. 17 is a plot characterizing of storage modulus (MPa), loss modulus, and tan(delta) for ECOFLEX 00-10 with 2% retarder over a range of frequencies and temperatures.

Figure 18:
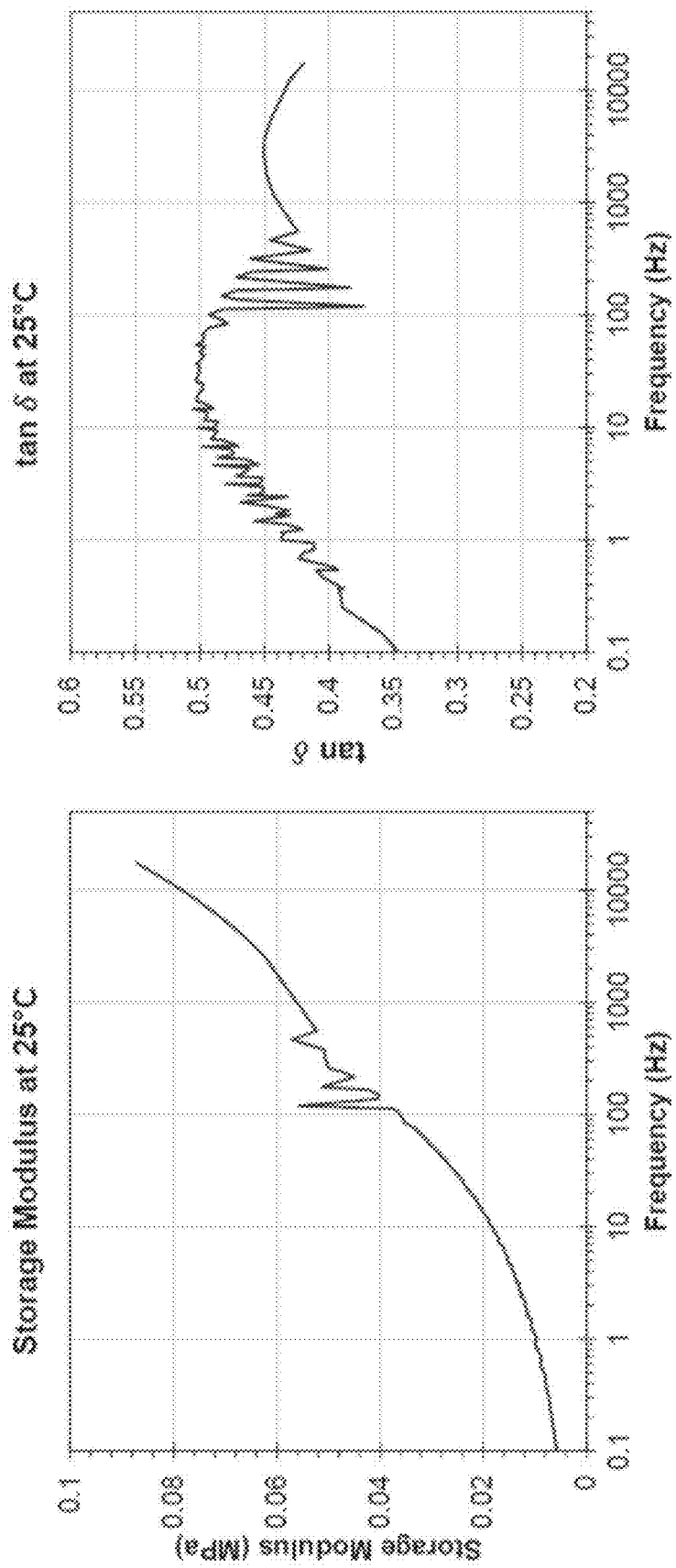
FIG. 18 illustrates two plots (of storage modulus and damping coefficient (tan(delta)) versus frequency) together showing a time-temperature superposition result for the ECOFLEX 00-10 with 2% retarder of FIG. 17.

FIG. 18 illustrates two plots (of storage modulus and tan(delta) versus frequency) together showing a time-temperature superposition for the ECOFLEX 00-10 with 2% retarder of FIG. 17.

Figure 19:
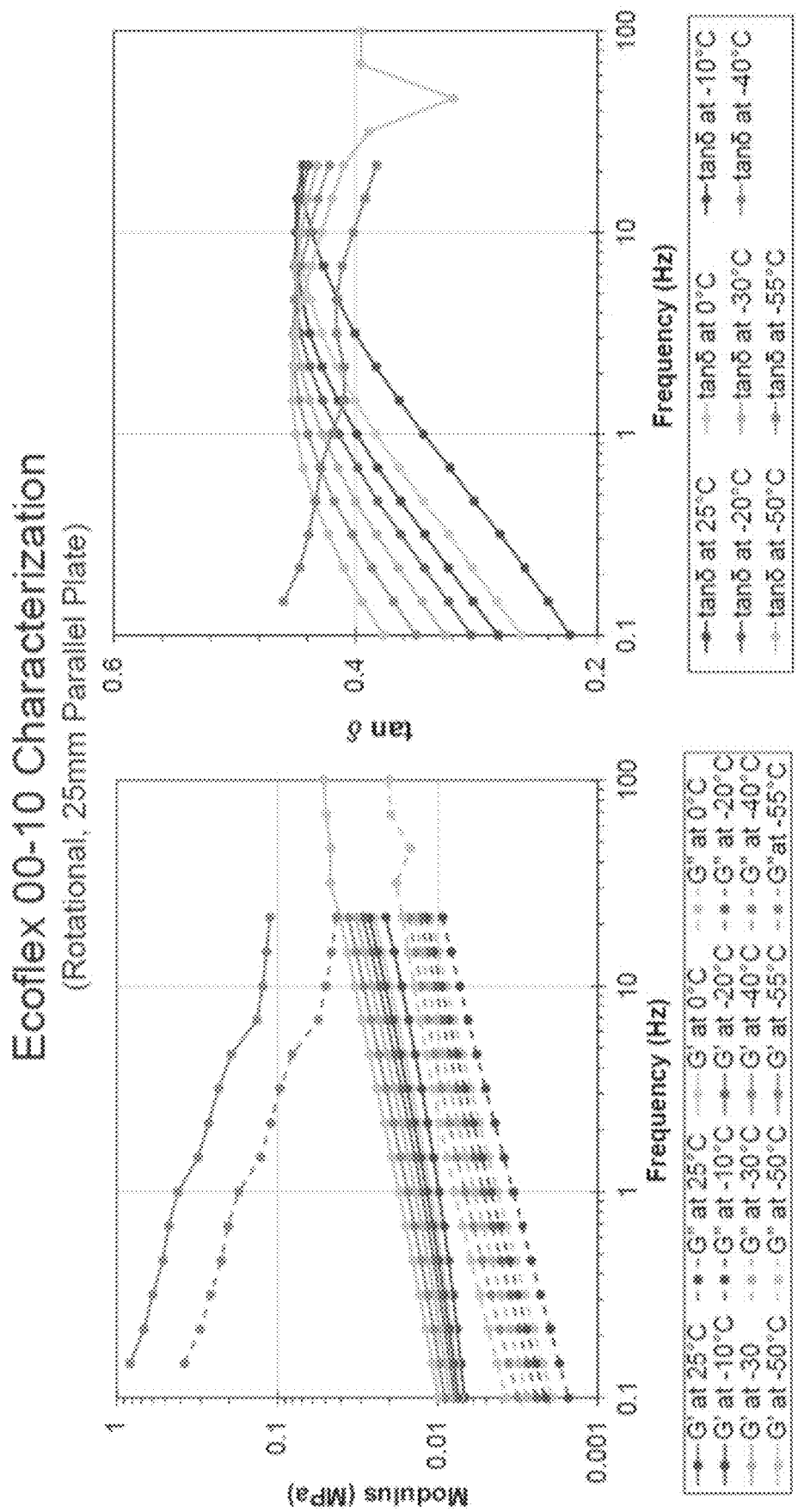
FIG. 19 is a plot characterizing of storage modulus (MPa), loss modulus, and damping coefficient (tan(delta)) for ECO-FLEX 00-10 over a range of frequencies and temperatures.

FIG. 19 is a plot characterizing storage modulus (MPa), loss modulus, and tan(delta) for ECOFLEX 00-10 over a range of frequencies and temperatures.

Figure 20:
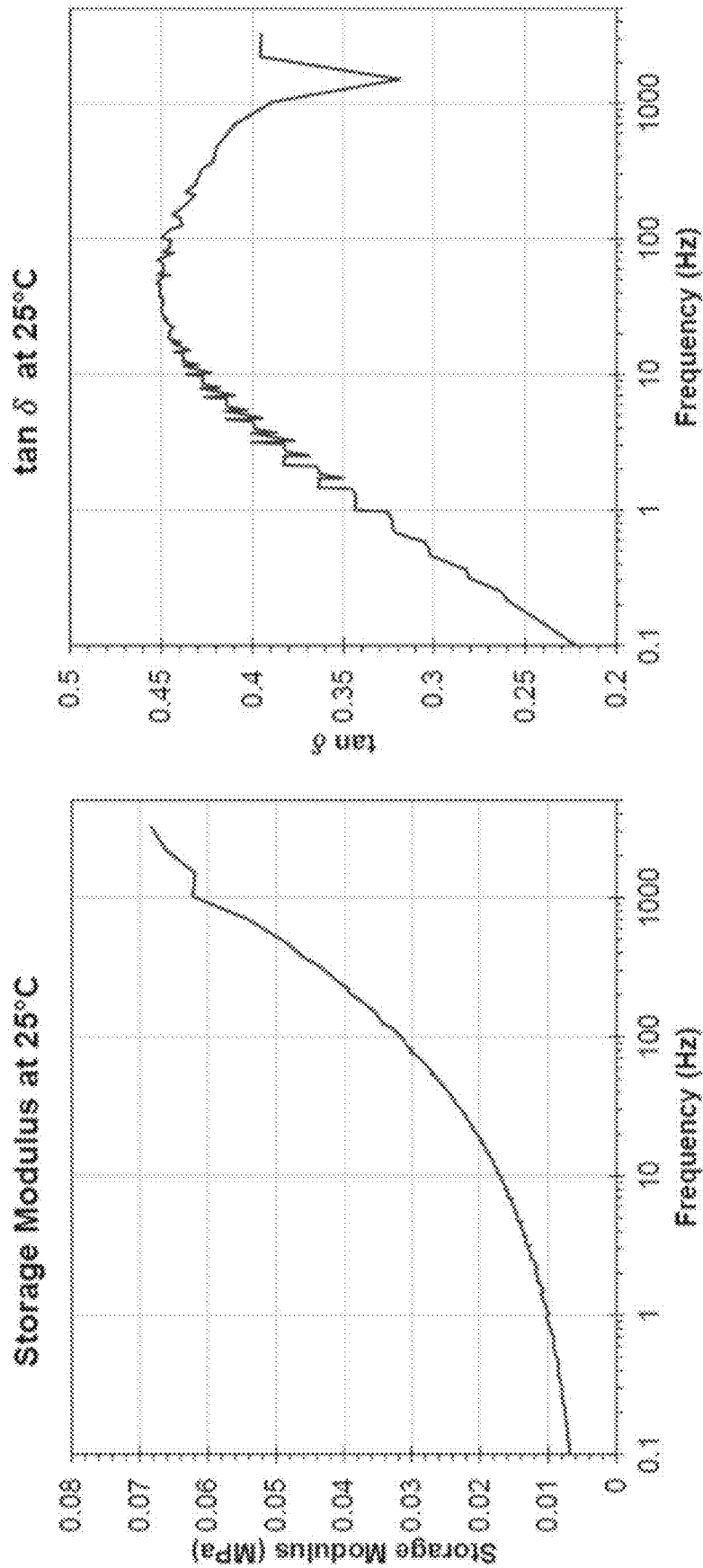
FIG. 20 illustrates two plots (of storage modulus and damping coefficient (tan(delta)) versus frequency) together showing a time-temperature superposition for the ECO-FLEX 00-10 of FIG. 19.

FIG. 20 illustrates two plots (of storage modulus and tan(delta) versus frequency) together showing a time-temperature superposition for the ECOFLEX 00-10 of FIG. 19.

Figure 21:
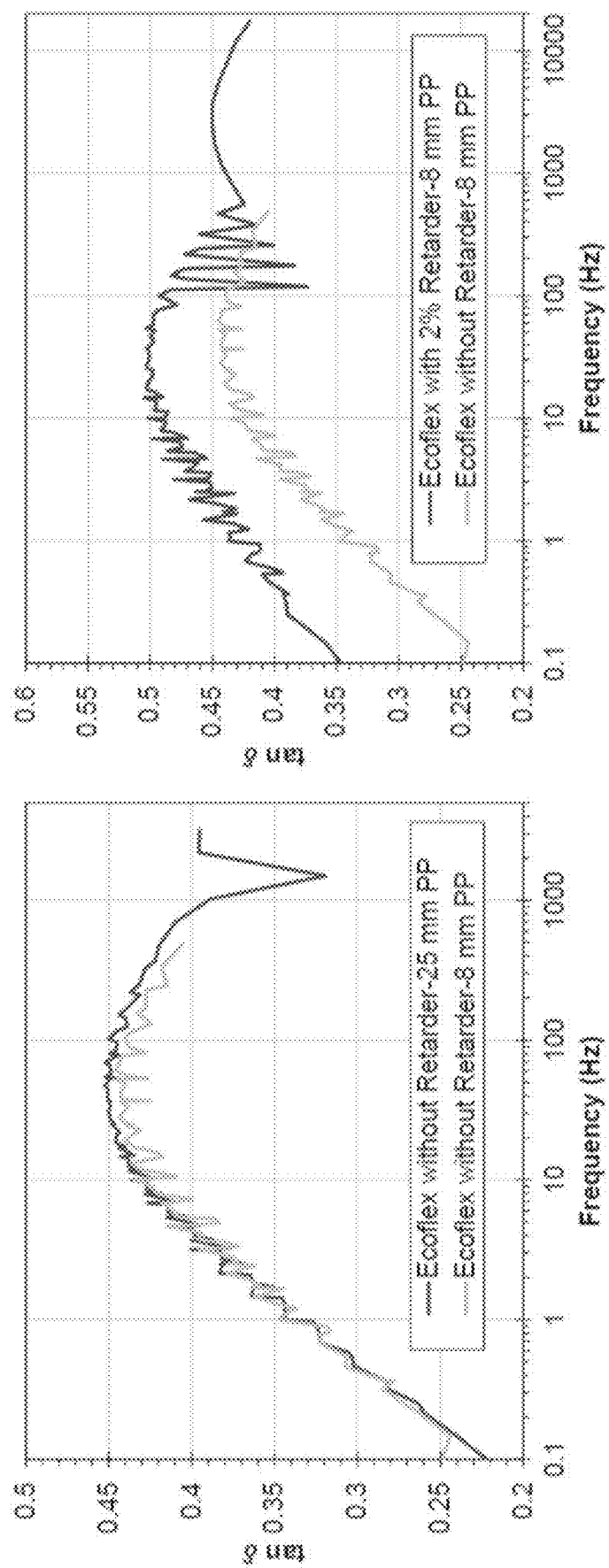
FIG. 21 includes two plots illustrating a comparison of loss factor over a range of frequencies.

FIG. 21 includes two plots illustrating a comparison of loss factor over a range of frequencies.

FIG. 22 is a series of images showing multiple views of an example head gimbal assembly with material RTV as layer 32. FIG. 22 provides a view of a head gimbal assembly including a strength beam 2233. FIG. 22 further includes multiple views of the head gimbal assembly including layer 2232 and strength beam 2233. The head gimbal assembly, layer 2232, and strength beam 2233 may be examples of HGA 22, layer 32, and strength beam 33 respectively.

FIG. 23 is a set of images showing views of a nozzle positioned to 3-D print a layer of damping material (Sylgard) on a surface. FIG. 23 provides a view of a nozzle 2364 positioned to deposit on an example head gimbal assembly including a strength beam 2333. Nozzle 2364 may be an example of nozzle 64, and strength beam 2333 may be an example of strength beam 33.

Figure 24:
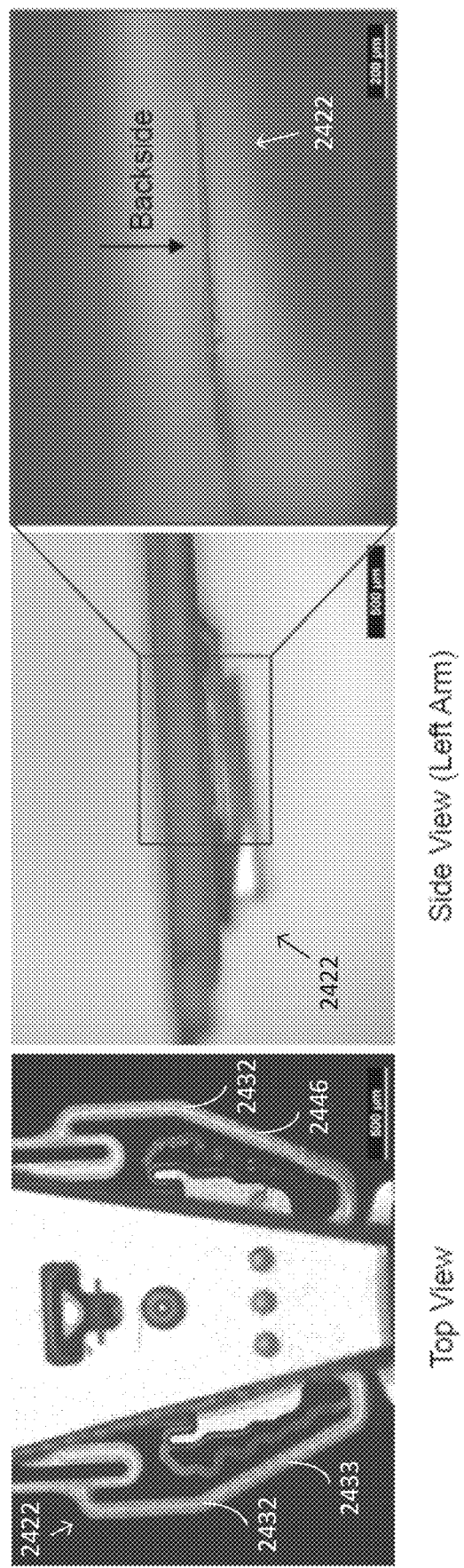
FIG. 24 is a series of images showing multiple views of the example head gimbal assembly of FIG. 23 after printing was complete.

FIG. 24 is a series of images showing multiple views of the example head gimbal assembly of FIG. 23 after printing was complete FIG. 24 provides a view of an example HGA 2422 including layer 2432, strength beam 2433, and strength beam 2446. HGA 2422, layer 2432, strength beam 2433, and strength beam 2446 may be examples of HGA 22, layer 32, strength beam 33, and strength beam 46 respectively.

Figure 25:
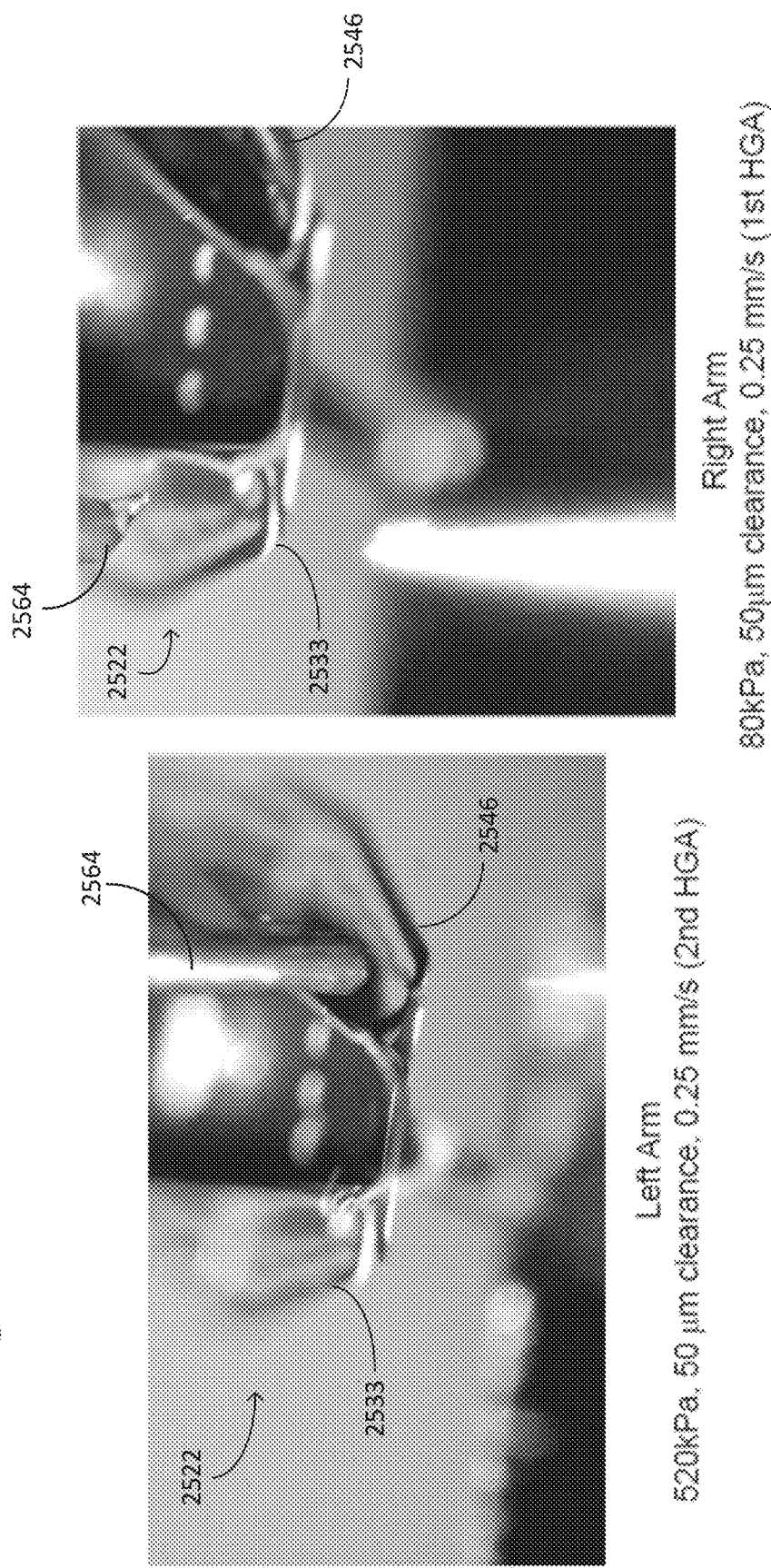
FIG. 25 is a set of images showing views of a nozzle positioned to 3-D print a layer of damping material on a surface.

FIG. 25 is a set of images showing views of a nozzle positioned to 3-D print a layer of damping material (Ecoflex) on a surface. FIG. 25 shows a nozzle 2564 positioned to deposit on an example HGA 2522 including a strength beam 2546 and a strength beam 2533. Nozzle 2564 may be an example of nozzle 64, HGA 2522 may be an example of HGA 22, strength beam 2546 may be an example of strength beam 46, and strength beam 2533 may be an example of strength beam 33.

Figure 26:
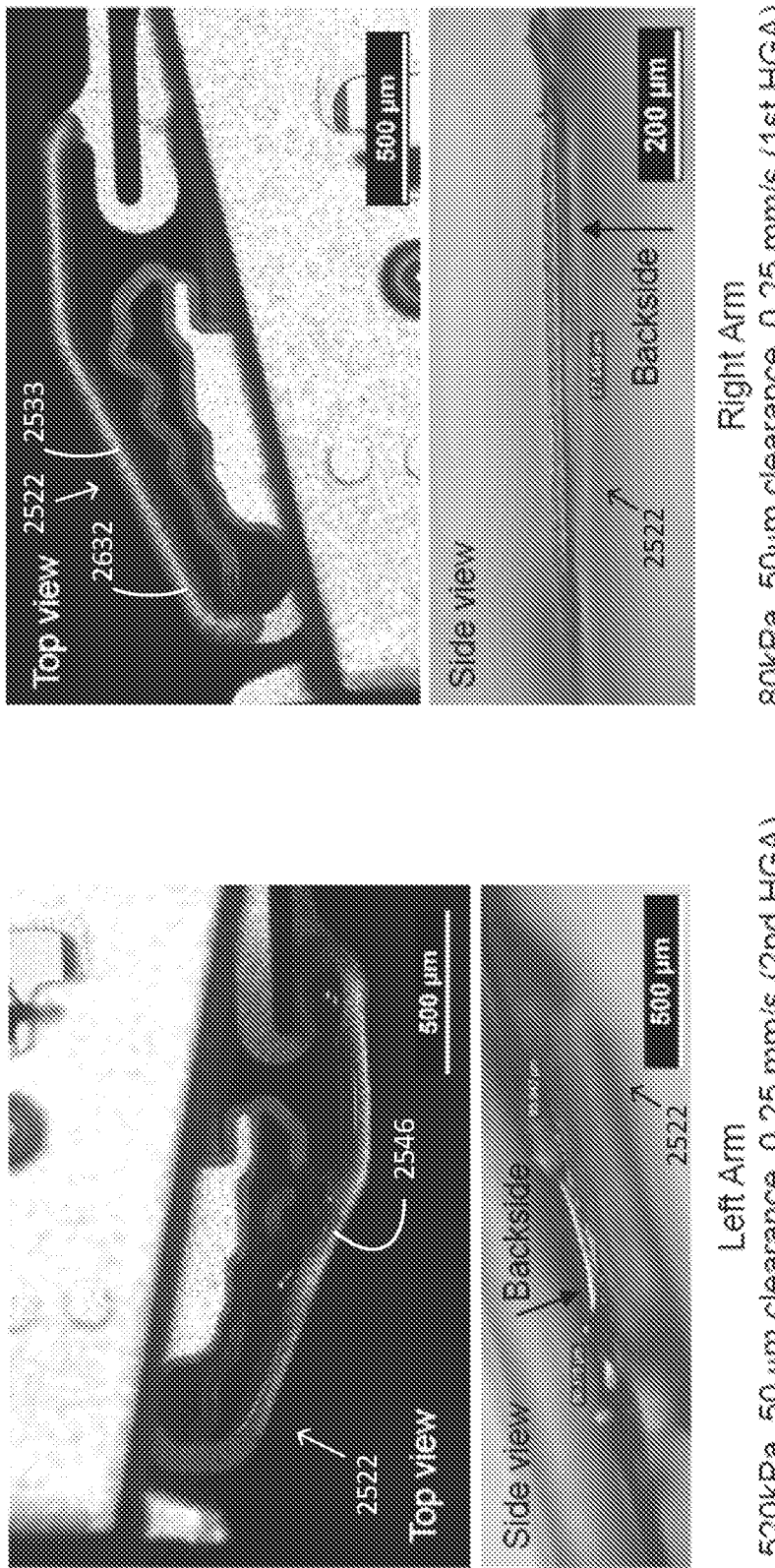
FIG. 26 is a series of images showing multiple views of the example head gimbal assembly of FIG. 25 after printing was complete.

FIG. 26 is a series of images showing multiple views of the example head gimbal assembly of FIG. 25 after printing was complete. FIG. 26 provides a view of HGA 2522 including layer 2632, strength beam 2533, and strength beam 2546. Layer 2632 may be an example of layer 32.

FIG. 27 is a set of images showing a view of a nozzle positioned to 3-D print a layer of damping material (Ecoflex with retarder) on a surface. FIG. 27 provides a view of a nozzle 2764 positioned to deposit on an example head gimbal assembly including a strength beam 2733 and a strength beam 2746. Nozzle 2764, strength beam 2433, and strength beam 2746 may be an example of nozzle 64, strength beam 33, and strength beam 46 respectively.

FIG. 28 is a table illustrating the evaluation metrics for RTV Silicon, SYLGARD 184, and ECOFLEX 00-10.

The disclosure includes the following examples.

Example 1: A head gimbal assembly comprising: a suspension, wherein the suspension is configured to establish mechanical communication with a motor arm of a motor, and wherein the suspension is configured to establish mechanical communication with a slider and a read/write head; and a layer on a surface of the suspension, wherein the layer comprises a damping material.

Example 2: The head gimbal assembly of example 1, further comprising: a lower side of the head gimbal assembly, wherein the lower side is configured to face a disc of a hard disc drive system; and an upper side of the head gimbal assembly opposite the lower side, wherein the layer is on at least one of the upper side or the lower side.

Example 3: The head gimbal assembly of example 1 or example 2, wherein the damping material comprises a viscoelastic material.

Example 4: The head gimbal assembly of any of examples 1-3, wherein the damping material comprises silicone.

Example 5: The head gimbal assembly of any of examples 1-4, wherein the damping material comprises a thermosetting polymer.

Example 6: The head gimbal assembly of any of examples 1-5, wherein the damping material comprises a thermoplastic polymer.

Example 7: The head gimbal assembly of any of examples 1-6, wherein the damping material comprises at least one of a composite or a foam.

Example 8: The head gimbal assembly of any of examples 1-7, wherein the damping material comprises a polymer including embedded particles.

Example 9: The head gimbal assembly of example 8, wherein the embedded particles include at least one of inorganic particles, nanoparticles, nanotubes, nanowires, or microspheres.

Example 10: The head gimbal assembly of any of examples 1-9, wherein the damping material comprises a piezoelectric material.

Example 11: The head gimbal assembly of any of examples 1-10, wherein the damping material comprises a shape-memory material.

Example 12: The head gimbal assembly of any of examples 1-11, wherein the damping material comprises at least one of a liquid crystal or a liquid crystal polymer.

Example 13: The head gimbal assembly of any of examples 1-12, wherein the damping material comprises at least one of an ionic liquid or an ionic polymer-metal composite.

Example 14: The head gimbal assembly of any of examples 1-13, wherein the damping material comprises a hydrogel.

Example 15: The head gimbal assembly of any of examples 1-14, further comprising an electrical lead electrically connected to the layer.

Example 16: The head gimbal assembly of any of examples 1-15, wherein the layer has a thickness less than about 500 microns, wherein the thickness is measured substantially perpendicular to the surface.

Example 17: The head gimbal assembly of any of examples 1-16, wherein the layer comprises a first individual layer and a second individual layer on the first individual layer, such that the first individual layer is between the second individual layer and the surface.

Example 18: The head gimbal assembly of example 17, wherein the layer comprises a third individual layer on the individual second layer, such that the second individual layer is between the third individual layer and the first individual layer.

Example 19: The head gimbal assembly of example 18, wherein the layer comprises a fourth individual layer on the third individual layer, such that the third individual layer is between the fourth individual layer and the second individual layer.

Example 20: The head gimbal assembly of any of examples 17-19, wherein at least one of the first individual layer, the second individual layer, the third individual layer, or the fourth individual layer have an individual thickness of less than about 100 microns.

Example 21: The head gimbal assembly of any of examples 1-20, wherein the suspension comprises a slider mount configured to establish the mechanical communication with the slider and the read/write head, wherein the layer is laterally displaced from the slider mount.

Example 22: The head gimbal assembly of example 21, further comprising: a strength beam having a midsection between a first end and a second end, wherein the first end and the second end are attached to the slider mount and the midsection is laterally displaced from the slider mount, and wherein the strength beam comprises the surface.

Example 23: The head gimbal assembly of example 22, wherein the strength beam is a first strength beam, further comprising a second strength beam, wherein the slider mount is between the first strength beam and the second strength beam, and wherein the second strength beam comprises a second surface, a second layer being on the second surface, wherein the second layer comprises the damping material.

Example 24: The head gimbal assembly of examples 22 or 23, wherein the strength beam includes a curved section having a spline joining a first curved portion and a second curved section, wherein the layer is on the curved section.

Example 25: The head gimbal assembly of example 24, wherein at least one of the first curved portion or the second curved section is substantially coplanar with the slider mount.

Example 26: The head gimbal assembly of any of examples 22-25, wherein the second end is configured to flex around an axis intersecting the slider mount when the slider mount flexes around the axis.

Example 27: The head gimbal assembly of any of examples 1-26, further comprising an air bearing in mechanical communication with the suspension.

Example 28: The head gimbal assembly of any of examples 1-27, further comprising the motor arm, wherein the motor arm is in mechanical communication with the suspension.

Example 29: The head gimbal assembly of example 28, further comprising a motor configured to position the motor arm over a surface of a hard disc.

Example 30: A method of modifying a head gimbal assembly, the method comprising: depositing a layer on a surface of a suspension configured to establish mechanical communication with a motor arm of a motor and configured to establish mechanical communication with a slider and a read/write head comprising the head gimbal assembly, wherein the layer comprises a damping material.

Example 31: The method of examples 30, wherein depositing the layer comprises 3-D printing the layer.

Example 32: The method of example 30 or 31, wherein depositing the layer on the surface comprises depositing the layer on an upper side of the head gimbal assembly or a lower side of the head gimbal assembly opposite the upper side of the head gimbal assembly, wherein the lower side of the head gimbal assembly is configured to face a disc of a hard disc drive system.

Example 33: The method of any of examples 30-32, further comprising limiting a thickness of the layer to less than about 500 microns, wherein the thickness is measured perpendicular to the surface.

Example 34: The method of any of examples 30-33, wherein depositing the layer comprises depositing an elastomer.

Example 35: The method of any of examples 30-34, wherein depositing the layer comprises depositing a silicone.

Example 36: The method of any of examples 30-35, wherein depositing the layer comprises depositing a thermosetting polymer.

Example 37: The method of any of examples 30-36, wherein depositing the layer comprises depositing a thermoplastic polymer.

Example 38: The method of any of examples 30-37, wherein depositing the layer comprises depositing a thermoplastic polymer.

Example 39: The method of any of examples 30-38, wherein depositing the layer includes depositing a composite.

Example 40: The method of any of examples 30-39, wherein depositing the layer comprises depositing a polymer including embedded particles.

Example 41: The method of examples 40, wherein depositing the polymer including embedded particles includes depositing the polymer including at least one of inorganic particles, nanoparticles, nanotubes, nanowires, or microspheres.

Example 42: The method of any of examples 30-41, wherein depositing the layer comprises depositing a piezoelectric material.

Example 43: The method of any of examples 30-42, wherein depositing the layer comprises depositing a shape-memory material.

Example 44: The method of any of examples 30-43, wherein depositing the layer comprises depositing at least one of a liquid crystal or a liquid crystal polymer.

Example 45: The method of any of examples 30-44, wherein depositing the layer comprises depositing at least one of an ionic liquid or an ionic polymer-metal composite.

Example 46: The method of any of examples 30-45, wherein depositing the layer comprises depositing a hydrogel.

Example 47: The method of any of examples 30-46, further comprising electrically connecting an electrical lead to the layer.

Example 48: The method of any of examples 30-47, wherein depositing the layer comprises issuing a fluid through a nozzle of a printing head of a three-dimensional printer.

Example 49: The method of any of examples 30-48, wherein depositing the layer comprises depositing a first individual layer and depositing a second individual layer on the first individual layer.

Example 50: The method of example 49, further comprising curing the first individual layer prior to depositing the second individual layer on the first individual layer.

Example 51: The method of example 49 or example 50, wherein depositing the layer comprises depositing a third individual layer on the second individual layer.

Example 52: The method of example 51, further comprising curing the second individual layer prior to depositing the third individual layer.

Example 53: The method of any of example 51 or example 52, wherein depositing the layer comprises depositing a fourth individual layer on the third individual layer.

Example 54: The method of example 53, further comprising curing the third individual layer prior to depositing the fourth individual layer.

Example 55: The method of any of examples 49-54, further comprising limiting a thickness of an individual layer to less than about 100 microns, wherein the individual layer is at least one or the first individual layer, the second individual layer, the third individual layer, or the fourth individual layer.

Example 56: The method of any of examples 30-55, wherein depositing the layer comprises depositing the layer on a portion of the suspension displaced from a slider mount defined by the suspension, wherein the slider mount is configured to establish the mechanical communication with the slider and the read/write head.

Example 57: The method of example 56, wherein depositing the layer comprises depositing the layer on a strength beam having a first end attached to the slider mount and a second end attached to the slider mount.

Example 58: The method of example 57, wherein depositing the layer comprises depositing the layer on a midsection of the strength beam between the first end and the second end, wherein the midsection is laterally displaced from the slider mount.

Example 59: The method of example 57 or example 58, wherein the strength beam is a first strength beam, further comprising depositing the layer on a second strength beam having a first terminal end attached to the slider mount and a second terminal end attached to the slider mount.

Example 60: The method of any of examples 57-59, further comprising depositing the layer on at least one of a first side of the strength beam or a second side of the strength beam, wherein the first side of the strength beam is configured to away from a disc of a hard disc drive system and the second side of the strength beam is opposite the first side of the strength beam.

Example 61: The method of any of examples 57-60, wherein depositing the layer on the strength beam comprises depositing the layer on a curved section having a spline joining a first curved portion and a second curved section.

Example 62: A head gimbal assembly comprising: a suspension, wherein the suspension is configured to establish mechanical communication with a motor arm of a motor; a slider mount defined by the suspension, wherein the slide support area is configured to flex around an axis; a strength beam having a midsection between a first end and a second end, wherein the first end and the second end are attached to the slider mount and the midsection is displaced from the slider mount, wherein the second end is configured to flex around the axis when the slider mount flexes around the axis; a layer on a surface of the first strength beam between the first end and the second end, wherein the layer comprises a damping material; and an air bearing in mechanical communication with the slider mount, the air bearing having a surface configured to face a hard disc of a hard disc drive.

Example 63: The head gimbal assembly of example 62, wherein the layer has a thickness less than 500 microns, wherein the thickness is perpendicular to the surface of the strength beam.

Example 64: The head gimbal assembly of example 62 or example 63, wherein the layer comprises a first individual layer and a second individual layer deposited on the first individual layer, such that the first individual layer is between the second individual layer and the strength beam.

Example 65: The head gimbal assembly of example 64, wherein the layer comprises a third individual layer deposited on the second individual layer, such that the second individual layer is between the third individual layer and the first individual layer.

Example 66: The head gimbal assembly of example 66, wherein the layer comprises a fourth individual layer deposited on the third individual layer, such that the third individual layer is between the fourth individual layer and the second individual layer.

Example 67: The head gimbal assembly of any of examples 62-66, wherein at least one of the first individual layer, the second individual layer, the third individual layer, or the fourth individual layer have an individual thickness of less than about 100 microns.

Example 68: The head gimbal assembly of any of examples 62-67, wherein the strength beam has a first side facing in a direction away from the air bearing surface and a second side facing toward the air bearing surface, wherein the layer substantially covers the surface on at least one of the first side or the second side.

Example 69: The head gimbal assembly of any of examples 62-68, wherein the strength beam includes a curved section having a spline joining a first curved portion and a second curved section, wherein the layer is deposited on the curved section.

Example 70: The head gimbal assembly of any of examples 62-69, wherein the strength beam is a first strength beam, further comprising: a second strength beam, wherein some portion of the slider mount is between the first strength beam and the second strength beam, and wherein the second strength beam includes a first terminal end attached to the load beam and a second terminal end attached to the slider mount; and a second layer deposited on a surface of the second strength beam between the first terminal end and the second terminal end, wherein the second layer comprises a damping material.

Example 71: The head gimbal assembly of example 70, wherein the second terminal end is configured to flex around the axis when the slider mount flexes around the axis.

Example 72: The head gimbal assembly of any of examples 62-71, wherein the damping material comprises an elastomer.

Example 73: The head gimbal assembly of any of examples 62-72, wherein the damping material comprises silicone.

Example 74: The head gimbal assembly of any of examples 62-73, wherein the damping material comprises a thermosetting polymer.

Example 75: The head gimbal assembly of any of examples 62-74, wherein the damping material comprises a thermoplastic polymer.

Example 76: The head gimbal assembly of any of examples 62-75, wherein the damping material comprises a composite.

Example 77: The head gimbal assembly of any of examples 62-76, wherein the damping material comprises a polymer including embedded particles.

Example 78: The head gimbal assembly of any of examples 62-77, wherein the embedded particles include at least one of inorganic particles, nanoparticles, nanotubes, nanowires, or microspheres.

Example 79: The head gimbal assembly of any of examples 62-78, wherein the damping material comprises a piezoelectric material.

Example 80: The head gimbal assembly of any of examples 62-79, wherein the damping material comprises a shape-memory material.

Example 81: The head gimbal assembly of any of examples 62-80, wherein the damping material comprises at least one of a liquid crystal or a liquid crystal polymer.

Example 82: The head gimbal assembly of any of examples 62-81, wherein the damping material comprises at least one of an ionic liquid or an ionic polymer-metal composite.

Example 83: The head gimbal assembly of any of examples 62-82, wherein the damping material comprises a hydrogel.

Example 84: The head gimbal assembly of any of examples 62-83, further comprising an electrical lead electrically connected to the layer.

Various examples have been described. These and other examples are within the scope of the following claims.

The invention claimed is:

1. A head gimbal assembly comprising:
a suspension, wherein the suspension is configured to establish mechanical communication with a motor arm of a motor, and wherein the suspension is configured to establish mechanical communication with a slider and a read/write head; and
a layer comprising a first individual layer on a surface of the suspension and comprising a second individual layer atop the first individual layer, such that the first individual layer is between the second individual layer and the surface,
wherein the first individual layer comprises a first viscoelastic material and the second individual layer comprises at least one of the first viscoelastic material or a second viscoelastic material,
wherein the first individual layer has a first individual thickness less than 100 microns and the second individual layer has a second individual thickness less than 100 microns,
wherein the first individual thickness and the second individual thickness are measured substantially perpendicular to the surface, and
wherein the layer defines a free-layer damping material on the suspension.

2. The head gimbal assembly of claim 1 further comprising:
a lower side of the head gimbal assembly, wherein the lower side is configured to face a disc of a hard disc drive system; and
an upper side of the head gimbal assembly opposite the lower side, wherein the layer is on at least one of the upper side or the lower side.

3. The head gimbal assembly of claim 1, wherein the first viscoelastic material comprises a first elastomer, and wherein the second viscoelastic material comprises at least one of the first elastomer or a second elastomer.

4. The head gimbal assembly of claim 1, wherein at least one of the first individual layer or the second individual layer comprises silicone.

5. The head gimbal assembly of claim 1, wherein the at least one of the first viscoelastic material or the second viscoelastic material is a silicone-comprising material, wherein the silicon-comprising material is one of RTV Silicone, ECOFLEX, or SYLGARD.

6. The head gimbal assembly of claim 1, wherein the first individual layer has a first individual thickness of less than about 60 microns and the second individual layer has a second individual thickness of less than about 60 microns.

7. The head gimbal assembly of claim 1, further comprising:
the motor arm, wherein the motor arm is in mechanical communication with the suspension; and
a motor configured to position the motor arm over a surface of a hard disc.

8. The head gimbal assembly of claim 1, wherein the layer comprises one or more additional individual layers atop the second individual layer, such that the second individual layer is between the one or more additional individual layers and the first individual layer.

9. The head gimbal assembly of claim 8, wherein each of the one or more additional individual layers has an individual thickness of less than about 100 microns.

10. The head gimbal assembly of claim 1, wherein the suspension comprises a slider mount configured to establish the mechanical communication with the slider and the read/write head, wherein the layer is laterally displaced from the slider mount.

11. The head gimbal assembly of claim 10, further comprising:
a strength beam having a midsection between a first end and a second end,
wherein the first end and the second end are attached to the slider mount and the midsection is laterally displaced from the slider mount, and
wherein the strength beam comprises the surface.

12. The head gimbal assembly of claim 11, wherein the strength beam is a first strength beam, and further comprising a second strength beam, wherein the slider mount is between the first strength beam and the second strength beam, and wherein the second strength beam comprises a second surface, an additional layer being on the second surface, wherein the additional layer comprises at least one of the first viscoelastic material or the second viscoelastic material.

13. The head gimbal assembly of claim 11, wherein the second end is configured to flex around an axis intersecting the slider mount when the slider mount flexes around the axis.

14. The head gimbal assembly of claim 1, further comprising an air bearing in mechanical communication with the suspension.

15. A method of providing a free-layer damping material on a head gimbal assembly, the method comprising:
depositing a first individual layer having a first individual thickness less than 100 microns on a surface of a suspension configured to establish mechanical communication with a motor arm of a motor and configured to establish mechanical communication with a slider and a read/write head of the head gimbal assembly, wherein the first individual layer comprises a first viscoelastic material; and
depositing a second individual layer having a second individual thickness less than 100 microns atop the first individual layer, such that the first individual layer is between the second individual layer and the surface, wherein the second individual layer comprises at least one of the first viscoelastic material or a second viscoelastic material,
wherein the first individual thickness and the second individual thickness are measured substantially perpendicular to the surface, and
wherein the first individual layer and the second layer comprise the free-layer damping material.

16. The method of claim 15, wherein depositing the first individual layer on the surface comprises depositing the first individual layer on an upper side of the head gimbal assembly or a lower side of the head gimbal assembly opposite the upper side of the head gimbal assembly, wherein the lower side of the head gimbal assembly is configured to face a disc of a hard disc drive system.

17. The method of claim 15,
wherein depositing the first individual layer includes,
dispensing at least a portion of the first viscoelastic material and a solvent on the surface, and
removing at least some portion of the solvent to produce a deposited layer, and
wherein depositing the second individual layer includes depositing the second individual layer atop the deposited layer.

* * * * *